United States Patent
Kizu et al.

(10) Patent No.: US 9,826,538 B2
(45) Date of Patent: *Nov. 21, 2017

(54) RADIO COMMUNICATION DEVICE AND SEMICONDUCTOR INTEGRATED CIRCUIT DEVICE USED FOR THE SAME

(71) Applicant: KABUSHIKI KAISHA TOSHIBA, Minato-ku, Tokyo (JP)

(72) Inventors: Toshiki Kizu, Yokohama (JP); Yoshimitsu Shimojo, Kawasaki (JP); Yoshinori Shigeta, Kawasaki (JP); Yasuro Shobatake, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 14/869,753

(22) Filed: Sep. 29, 2015

(65) Prior Publication Data

US 2016/0021675 A1 Jan. 21, 2016

Related U.S. Application Data

(60) Continuation of application No. 14/331,820, filed on Jul. 15, 2014, now Pat. No. 9,178,687, which is a (Continued)

(30) Foreign Application Priority Data

Jan. 27, 2005 (JP) .................................. 2005-019980

(51) Int. Cl.
*H04L 1/20* (2006.01)
*H04W 72/08* (2009.01)
(Continued)

(52) U.S. Cl.
CPC .......... *H04W 72/085* (2013.01); *H04B 1/713* (2013.01); *H04B 1/715* (2013.01);
(Continued)

(58) Field of Classification Search
CPC ......... H04L 7/0054; H04L 1/20; H04B 1/713; H04B 1/7136; H04B 1/715;
(Continued)

(56) References Cited

U.S. PATENT DOCUMENTS 5,600,629 A 2/1997 Van Daele et al.
6,115,408 A 9/2000 Gendel et al.
(Continued)

FOREIGN PATENT DOCUMENTS

CN 1362794 A 8/2002
CN 1362795 A 8/2002
(Continued)

OTHER PUBLICATIONS

Chinese Office Action dated Aug. 5, 2015 issued in corresponding application CN 201410277787.6 and its English translation.
(Continued)

*Primary Examiner* — Michael Neff
(74) *Attorney, Agent, or Firm* — Foley & Lardner LLP

(57) ABSTRACT

A semiconductor integrated circuit for a radio communication terminal sequentially uses a plurality of frequency channels by instructions from a hopping frequency decision unit to receive packet data by a reception unit. When the integrated circuit cannot detect the head of the packet data in reception operations, the integrated circuit cannot receive packet data should be received originally then assumes that the received packet data is a packet error. And the integrated circuit calculates packet error rates for each frequency channel on the basis of the number of times of reception operations performed for each frequency channel and of the
(Continued)

number of times of packet errors to estimate channel qualities by using the packet error rates.

15 Claims, 16 Drawing Sheets

Related U.S. Application Data continuation of application No. 13/775,840, filed on Feb. 25, 2013, now Pat. No. 8,804,788, which is a division of application No. 12/500,755, filed on Jul. 10, 2009, now Pat. No. 8,406,273, which is a division of application No. 11/340,853, filed on Jan. 27, 2006, now abandoned.

(51) Int. Cl.
*H04B 1/713* (2011.01)
*H04B 1/715* (2011.01)
*H04W 52/04* (2009.01)
*H04B 1/7136* (2011.01)
*H04L 7/00* (2006.01)
*H04W 24/08* (2009.01)
*H04W 72/04* (2009.01)

(52) U.S. Cl.
CPC ............ *H04B 1/7136* (2013.01); *H04L 1/20* (2013.01); *H04L 7/0054* (2013.01); *H04W 24/08* (2013.01); *H04W 52/04* (2013.01); *H04W 72/0453* (2013.01); *H04B 2001/7154* (2013.01); *Y02B 60/50* (2013.01)

(58) Field of Classification Search
CPC .......... H04B 2001/7154; H04W 24/08; H04W 52/04; H04W 72/0453
USPC ....................................................... 375/136
See application file for complete search history.

(56) References Cited

U.S. PATENT DOCUMENTS

| | | |
|---|---|---|
| 6,249,540 B1 | 6/2001 | Dicker et al. |
| 6,480,721 B1 | 11/2002 | Sydon et al. |
| 6,647,053 B1 | 11/2003 | Garces |
| 6,751,249 B1 | 6/2004 | Cannon et al. |
| 7,006,451 B2 | 2/2006 | Kuwahara |
| 7,016,395 B2 | 3/2006 | Watanabe et al. |
| 7,620,072 B2 | 11/2009 | Kihara |
| 9,178,687 B2 * | 11/2015 | Kizu ................ H04B 1/715 |
| 2002/0080739 A1 | 6/2002 | Kuwahara |
| 2002/0080855 A1 | 6/2002 | Watanabe et al. |
| 2003/0058922 A1 | 3/2003 | Suwa |
| 2004/0152490 A1 | 8/2004 | Aoyama et al. |
| 2004/0242258 A1 | 12/2004 | Kim |
| 2004/0258137 A1 | 12/2004 | Felbecker et al. |
| 2004/0258185 A1 | 12/2004 | Kihara |
| 2005/0008064 A1 | 1/2005 | Hammes et al. |
| 2005/0215284 A1 | 9/2005 | Su et al. |
| 2006/0023749 A1 | 2/2006 | Yoshizawa et al. |
| 2008/0317150 A1 | 12/2008 | Alexander et al. |
| 2009/0021641 A1 | 1/2009 | Matsuura et al. |

FOREIGN PATENT DOCUMENTS

| | | |
|---|---|---|
| CN | 1522504 A | 8/2004 |
| CN | 1551672 A | 12/2004 |
| EP | 0 182 762 A1 | 5/1986 |
| EP | 1220499 A2 | 7/2002 |
| GB | 2399982 A | 9/2004 |
| JP | 07-297761 A | 11/1995 |
| JP | 2001-326974 A | 11/2001 |
| JP | 2002-198867 A | 7/2002 |
| JP | 2002-198868 A | 7/2002 |
| JP | 2002-291067 A | 10/2002 |
| JP | 2003-163652 A | 6/2003 |
| JP | 3443094 B2 | 6/2003 |
| JP | 2003-318869 A | 11/2003 |
| JP | 2005-012340 A | 1/2005 |
| JP | 2005-045388 A | 2/2005 |
| JP | 2005-130122 | 5/2005 |
| JP | 2006-019881 A | 1/2006 |
| WO | WO 99/09671 A1 | 2/1999 |
| WO | WO 00/08801 A2 | 2/2000 |
| WO | WO 00/08801 A3 | 2/2000 |

OTHER PUBLICATIONS

Toshiko Kizu et al., U.S. Office Action/Species Election Requirement, U.S. Appl. No. 11/340,853, dated Jan. 23, 2009, 7 pages.
Toshiko Kizu et al., U.S. Office Action, U.S. Appl. No. 11/340,853, dated Apr. 21, 2009, 7 pages.
"Specification of the Bluetooth System," Version 1.2, vol. 2, Nov. 5, 2003, pp. 161-162.
Chinese Office Action dated Jul. 5, 2013 and English Translation issued in counterpart Chinese Application, 13 pages.
T. Kizu, U.S. Office Action, U.S. Appl. No. 13/775,869, dated Oct. 8, 2013, 10 pages.
Chinese Office Action and English Translation issued in counterpart Chinese Application, dated Sep. 30, 2013, 11 pages.
T. Kizu, U.S. Notice of Allowance, U.S. Appl. No. 13/775,869, dated Mar. 14, 2014, 10 pages.
T. Kizu, U.S. Notice of Allowance, U.S. Appl. No. 14/331,820, dated Sep. 24, 2015, 5 pages.
T. Kizo, U.S. Office Action, U.S. Appl. No. 14/331,820, dated Jun. 30, 2015, 7 pages.
T. Kizu, U.S. Office Action, U.S. Appl. No. 14/331,820, dated Feb. 12, 2015, 5 pages.

* cited by examiner

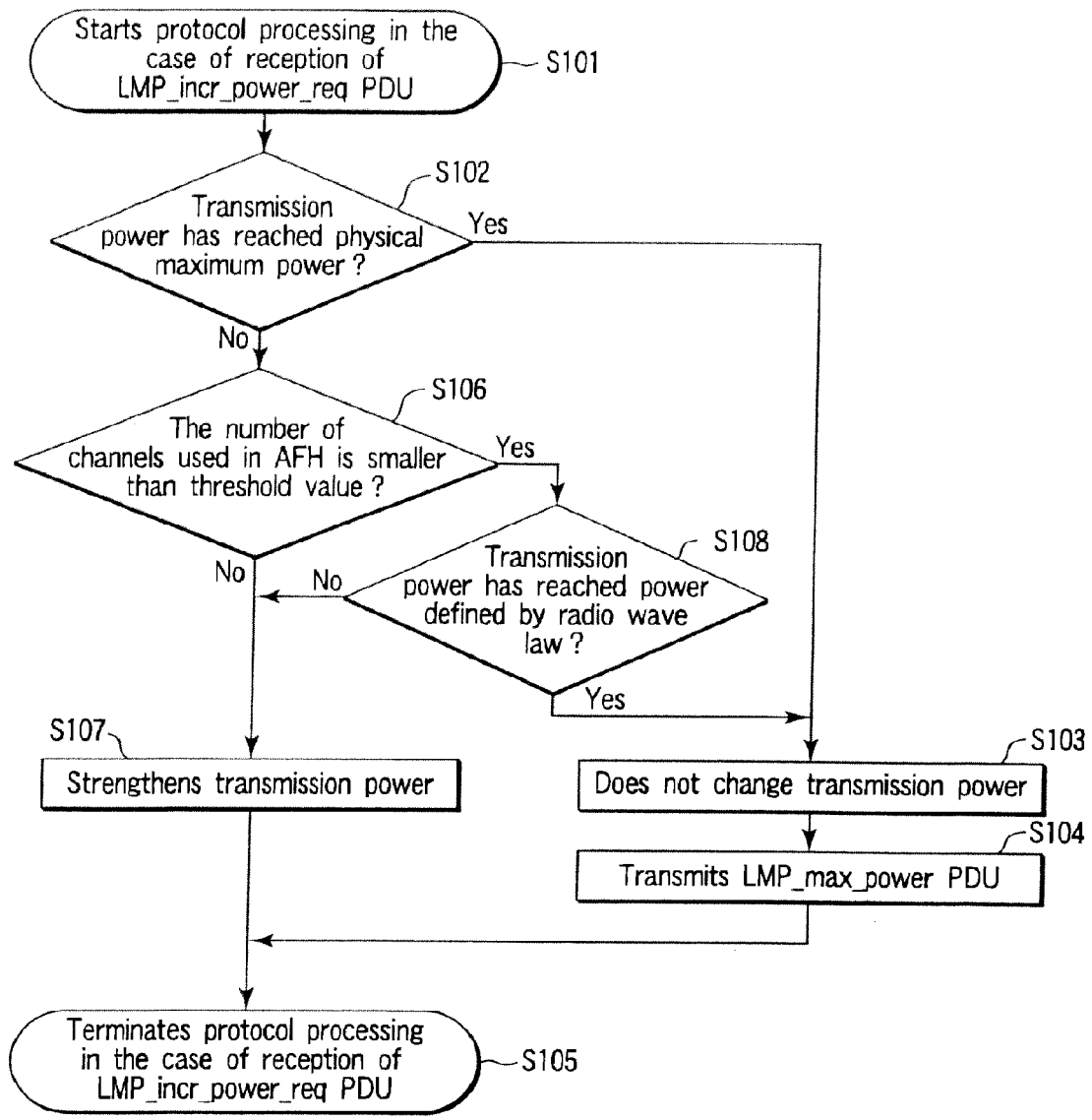
F I G. 20

RADIO COMMUNICATION DEVICE AND SEMICONDUCTOR INTEGRATED CIRCUIT DEVICE USED FOR THE SAME

CROSS-REFERENCE TO RELATED APPLICATIONS

The present application is a continuation of U.S. application Ser. No. 14/331,820, filed Jul. 15, 2014, which in turn is a continuation of U.S. application Ser. No. 13/775,840, filed Feb. 25, 2013, which is a divisional of U.S. application Ser. No. 12/500,755, filed Jul. 10, 2009, which is a divisional of U.S. application Ser. No. 11/340,853, filed Jan. 27, 2006, which is based upon and claims the benefit of priority from prior Japanese Patent Application No. 2005-019980, filed Jan. 27, 2005, the entire contents of which are incorporated herein by reference.

BACKGROUND OF THE INVENTION

1. Field of the Invention

This invention relates to a radio communication device and a semiconductor integrated circuit used for the same. More specifically, the present invention relates to a radio communication device employing a channel quality estimation method, a method for deciding a channel to be used and a method for deciding transmission power in a radio data communication of a frequency hopping system and relates to a semiconductor integrated circuit device used for the same.

2. Description of the Related Art

In recent years, a new radio communication system to connect electronic appliances with one another by radio has been developed. The IEEE 802.11b/g, Bluetooth (trade mark) and the like are known as this kind of radio communication system.

The IEEE 802.11b/g is a standard of a short-range radio communication system proposed for a wireless local area network (LAN). The Bluetooth is a standard of a short-range radio communication system proposed for connection among not only computers but a variety of appliances with one another. In these radio communication systems, the 2.4 GHz band called an industrial scientific and medical band (ISM band) is used as a frequency band allowed to be freely used without any license on a condition that a prescribed standard is satisfied. The IEEE 802.11b/g adopts a direct sequence spread spectrum (DSSS) technology so as to maximize influences of noise signals generated from other electronic appliances, for example, electronic ovens or the like present in the ISM band of the 2.4 GHz band. The Bluetooth adopts a frequency hopping spread spectrum (FHSS) technology of the frequency hopping system. Each technology, then, achieves sufficient noise-resistance for the radio communication system.

More specifically, a Bluetooth-compatible portable device (hereinafter, referred to as Bluetooth device) is used to exchange data among a cellular phone, a personal digital assistant (PDA), a notebook personal computer, a sound terminal appliance, etc. In this case, the frequency hopping system is adopted, wherein one channel is selected from among 79 frequency channels defined in a frequency band from the 2.40 GHz to the 2.48 GHZ and it is switched with the lapse of time to make a radio communication. This frequency hopping system repeatedly selects channels at every fixed time period, for example, at every 625 μs on the basis of a preset pseudo random algorithm and assigns one packet of data to the one channel to make a communication. On the other hand, a wireless LAN station using the 2.4 GHz band does not employ frequency hopping but employs a constantly fixed and set frequency band, namely, contiguous frequency widths equivalent to almost 20 channels of the Bluetooth device.

FIG. 1 shows frequency relationships when the Bluetooth device and the wireless appliance use the ISM band of the 2.4 GHz. The Bluetooth divides almost entire areas of the ISM band of the 2.4 GHz into 79 channels of 1 MHz width and communicates while sequentially changing the frequencies used by the 79 channels at every 625 μs in accordance with a preset sequence defined by appliance addresses or the like.

On the other hand, the wireless LAN defines total 13 channels in the ISM band of the 2.4 GHz. A band width occupied by the one channel is 20 MHz and these 13 channels are arranged in a manner that a part of them are overlapped one another, as shown in FIG. 1. Any one channel is assigned to each access point of the wireless LAN at the time of setting thereof, and communications are made by suing the assigned channels. The influences of the noise signals are reduced by employing the DSSS system. Channels are assigned to each access point so as not interfere with one another when a plurality of access points are arranged in order to overlap mutual service areas.

As shown in FIG. 1, presence of the Bluetooth device and the wireless LAN appliance in an identical frequency area causes a mutual communication to be interfered by radio waves transmitted from each other. To meet this interference, the Bluetooth device adopts an adaptive frequency hopping (AFH) technology. The AFH technology prevents the interference between the Bluetooth device and wireless LAN appliance in a manner that the Bluetooth device observes the channels in any method to avoid the channel to be determined the presence of a radio wave to interfere its own communication and performs the frequency hopping.

To achieve the AFH, it is needed for the Bluetooth device to observe states of each channel and determine which channel should be used. Therefore, it is expected to adopt a method for estimating channel quality and method for deciding a channel to be used which decides the frequency to be used so as to avoid, with an appropriate response speed, use of channels with poor qualities by detecting channels surely influenced from others, namely channels with bad in quality. The Bluetooth device is frequently adapted to a small sized appliance with a small battery capacity such as a cellular phone and a head set needed to minimize its consumption current. The Bluetooth device also needs to avoid increase, as much as possible, in the consumption current resulting from the adaptation of the method for estimating the channel quality and the method for deciding the channel to be used.

In general, a method for a certain radio appliance to estimate a quality of channel to be used by itself includes a method for measuring a field strength of a radio wave present in the channel to be used prior to a communication (Passive method) and a method for assuming that the quality of the channel is poor when error rates of user data and control data in communication exceed preset values (Active method).

The former Passive method directly measures the filed strength, so that the Passive method can quickly detect interference from other appliances. However, since the radio appliance has to perform reception operations other than receptions of the user data and the control data, the consumption current is increased. A variety of error correction technologies are introduced into packets of the Bluetooth and if the interference is minor, the technologies can be suppressed affections of the interference by means of those correction technologies. But, in the case of the Passive method, it is impossible to know the degree of the actual affections of the measured radio waves affected on communications.

On the contrary, since the latter Active method detects the influence from other radio appliances by measuring the error rates of the user data and control data, the Active method has some advantages. That is, it is determined whether the influence is serious or not by adding actual affections of radio waves from interference sources on the communications, and the consumption current is not increased because the radio appliance does not receive other than the user data and control data. However, the Active method has problems such that a plurality of items of data has to be received to measure the error rates and it takes a long time to determine each channel condition. And the Active method further has a problem that interference waves are varied in strength with the elapse of time. The variations due to the elapse of time are caused because a radio wave propagation environment is varied with the elapse of time (fading phenomenon) or the use of channels is originally bursty like the wireless LAN. Since the strengths of the interference waves vary as the time goes on because of those causes, this variations of affections by the interference are also generated as a problem.

Furthermore, on the case of avoidance of use of channels with very poor qualities by means of the AFH, when qualities of most of channels in the ISM band become poor, it is worried that radio waves to be transmitted from the Bluetooth are collected to a part of the ISB band to influence adverse effects on other appliances.

The fact that it is possible for an evaluation of a channel quality of a radio communication using the AFH to use a bit error rate, a packet error rate, a signal to noise ratio (S/N) or the like is disclosed in Japanese Patent No. 3,443,094.

BRIEF SUMMARY OF THE INVENTION

According to an aspect of the present invention, there is provided a semiconductor integrated circuit device comprises a hopping frequency decision unit which selects one frequency channel from among the plurality of frequency channels; a transmission unit which assigns packet data to the selected frequency channel to+ transmit it; a reception unit which receives the packet data of the selected frequency channel; a error detection unit which assumes that there are packet errors incapable of receiving the packet data to be originally received because of deterioration of a channel quality if a head of the packet data could not be detected at the time when the reception unit performed reception operations of the packet data; and a control unit which estimates channel qualities of the frequency channels received by the reception unit, and which makes the hopping frequency decision unit perform frequency hopping, first by calculating packet error rates for each frequency channel on the basis of the number of the reception operations of the packet data and the number of the packet errors detected by the error detection unit, secondly by estimating channel qualities by using the packet error rates, thirdly by determining whether or not the received frequency channels are usable on the basis of a result of estimation of the channel qualities, and fourthly by avoiding the frequency channels determined to be unusable.

BRIEF DESCRIPTION OF THE SEVERAL VIEWS OF THE DRAWING

FIG. 20 is a flowchart showing a procedure deciding transmission power, executed by the Bluetooth device in an eleventh embodiment;

DETAILED DESCRIPTION OF THE INVENTION

Figure 1:
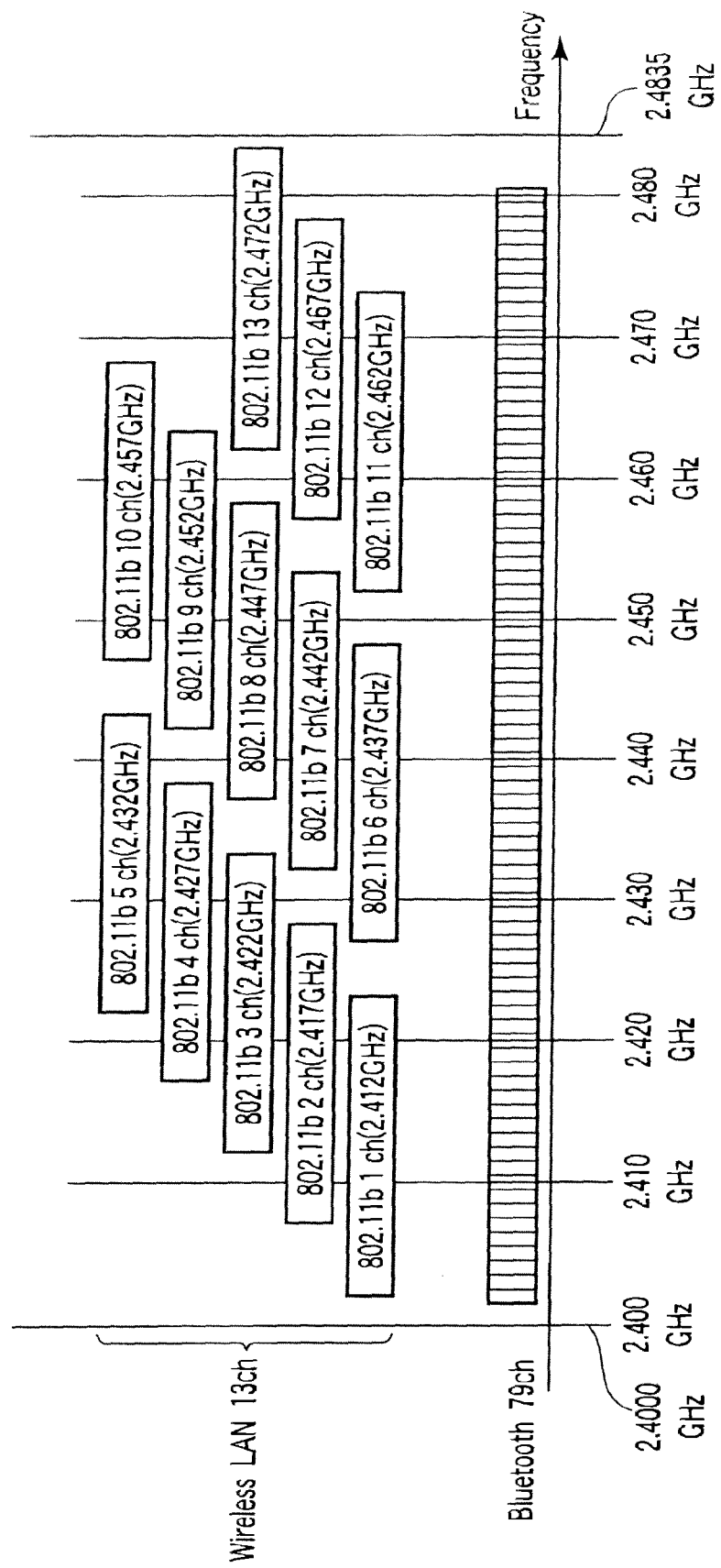
FIG. 1 is an exemplary view showing an example of frequencies to be used by a Bluetooth device and a wireless LAN appliance.

Hereinafter, the present invention will be described through embodiments by referring to drawings. In description, common parts are denoted by common reference numerals all over the drawings.

(First Embodiment)

Figure 2:
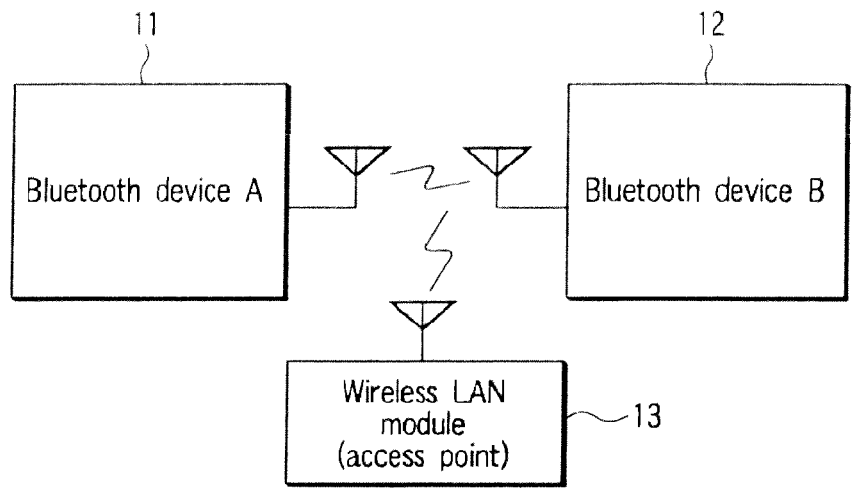
FIG. 2 is a block diagram of a radio communication system showing a Bluetooth device regarding a first embodiment of the invention together with an access point of a wireless LAN.

FIG. 2 is a block diagram of the radio communication system showing the Bluetooth device regarding the first embodiment of the invention together with the access point of the wireless LAN. The radio communication system shown in FIG. 2 shows two devices of first and second Bluetooth devices 11, 12 as each Bluetooth device; however, the number of the Bluetooth devices is not limited to two. The radio communication system in FIG. 2 includes an access point 13 of the wireless LAN other than the first and second Bluetooth devices 11, 12 and FIG. 2 shows a state in which a mutual radio communication between the first and second Bluetooth devices 11, 12 is interfered by a radio wave from the access point 13.

Figure 3:
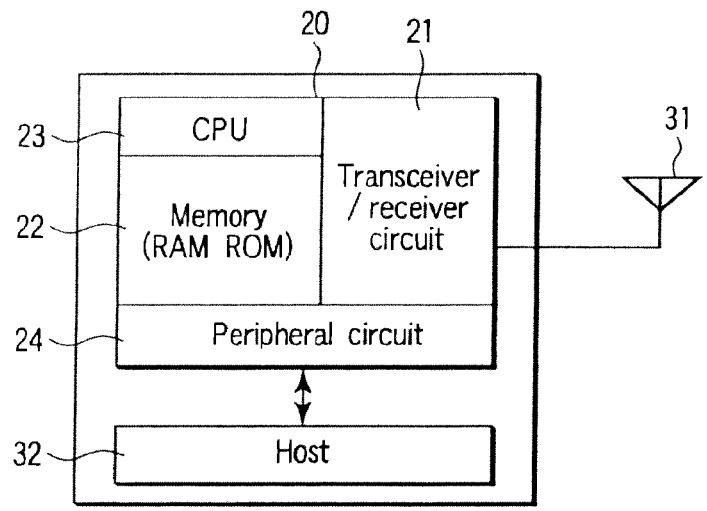
FIG. 3 is a block diagram showing a configuration of the Bluetooth device in FIG. 2.

The first and second Bluetooth devices in FIG. 2 includes a semiconductor integrated circuit device 20 (hereinafter, referred to as LSI) for Bluetooth integrated into one chip, a radio antenna 31 connected to the LSI 20 and a host 32, as shown in FIG. 3, respectively. A transceiver/receiver circuit 21 including a high-frequency (RF) circuit, an AD conversion circuit, a memory 22 consisting of a ROM and RAM to store firmware including a protocol stack, a CPU 23 and a peripheral circuit 24, and the like are integrated in the LSI 20. The transceiver/receiver circuit 21 connects the radio antenna 31 thereto and the peripheral circuit 24 connects the host 32 thereto.

The Bluetooth device shown in FIG. 3 is built in a device to perform a radio communication. An example for the device to perform the radio communication includes, for example, a cellular phone, a car navigation system, a car audio device, a personal computer, a personal digital assistant (PDA), a Bluetooth adapter, radio headset, a portable audio device, a digital camera, a printer, a cordless phone, a cordless mouse, a cordless keyboard, a gate controller, a general household electric appliance, and the like.

The Bluetooth device shown in FIG. 3 transmits and receives data and commands between the memory 22 and the host 32 via the peripheral circuit 24 under control by the CPU 23 and transmits data for a transmission stored in the memory 22 to the transceiver/receiver circuit 21 to transmit it as radio waves from the radio antenna 31. On the other hand, reception data is generated from the radio waves received through the radio antenna 31 and stored in the memory 22 then transmitted to the host 32 via the peripheral circuit 24.

Figure 4:
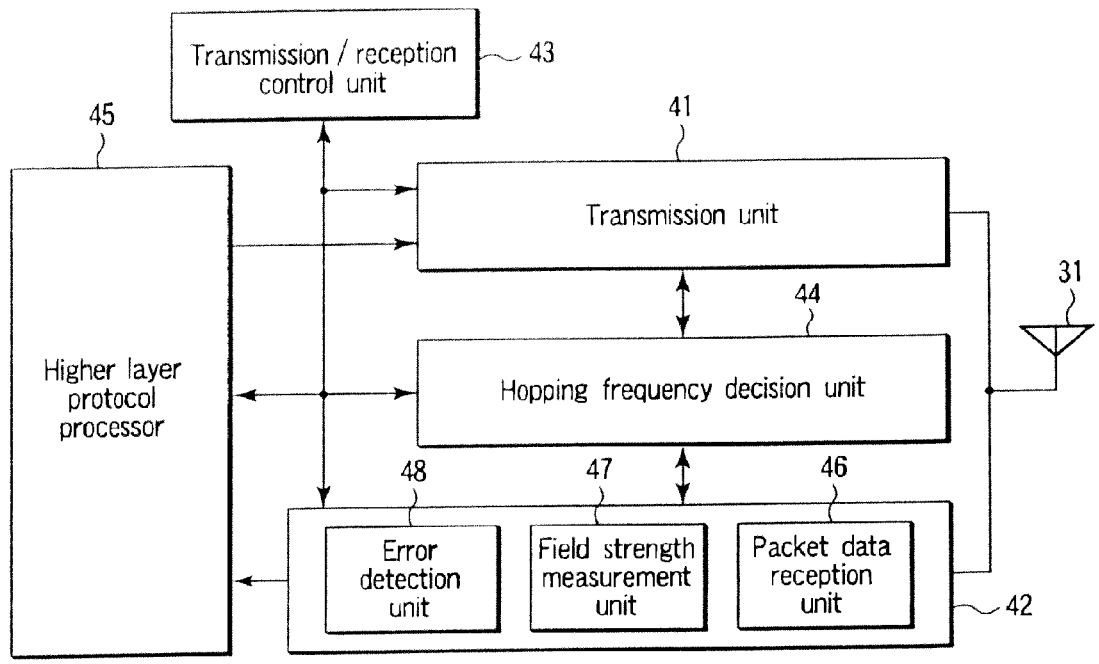
FIG. 4 is a block diagram showing a configuration of a semiconductor integrated circuit device focusing attention on a functional aspect of a CPU in FIG. 3.

FIG. 4 is a block diagram showing the configuration of the LSI 20 focusing attention on the functional aspect of the CPU 23 in FIG. 3. The circuit shown in FIG. 4 includes a transmission unit 41, a reception unit 42, a transmission/reception control unit 43, a hopping frequency decision unit 44 and a higher layer protocol processor 45. The radio antenna 31 is connected to the transmission unit 41 and the reception unit 42. The reception unit 42 has a packet data reception unit 46, a field strength measuring unit 47 and an error detection unit 48.

The Bluetooth devices 11, 12 in FIG. 1 are modules to perform radio communications based on the Bluetooth Specification released by the Bluetooth SIG and make communications by using the ISM band of 2.4 GHz band. The radio communication system of the Bluetooth Specification utilizes a spectrum diffusion communication of a frequency hopping system. The ISM band of the 2.4 GHz band is divided into 79 frequency channels (hereinafter, referred to as communication channel) with 1 MHz intervals, and channels to be used are switched on a time-division basis for each one time slot, based on the hopping patterns (frequency hopping). The radio communication system of the Bluetooth Specification adopts a master/slave system and a master manages the hopping patterns. The radio communication system can communicate by forming a radio network referred to as a pico-net among one master and slaves of maximum seven sets by using the same hopping pattern.

The LAN module at the access point 13 of the wireless LAN performs radio communications on the basis of the IEEE 802.11b standard and, likewise the Bluetooth device, performs communications by using the ISM band of the 2.4 GHz band. The radio communication system of the IEEE 802.11b standard utilizes a spectrum diffusion communication of a direct diffusion system. Thirteen frequency channels are assigned to the frequency band of the 2.4 GHz band with intervals of 5 MHz extent, and more than one arbitrary frequency channel among thirteen channels can be selected to be used. Forms of the radio networks include an Adhoc network to be used for communications among radio stations in an area called a basic service area (BSA) and an infrastructure network composed of a plurality of radio terminals and access points (AP). To prevent signal collisions on the radio network, a carrier sense/collision avoidance function called CSMA/CA is provided.

In the first embodiment, the Bluetooth devices 11, 12 respectively have transmission/reception control units 43 as communication channel control units so as to prevent interference between the radio communication of the foregoing IEEE 802.11b standard using the same radio frequency band and the radio communication of the Bluetooth Specification. The communication channel control unit of the Bluetooth device finds out a communication channel interfering with other radio communication system such as the IEEE 802.11b from among communication channels employed by the Bluetooth device to stop the use of the communication channel and performs control to release the stopped communication channel for other radio communication system. The memory 22 in FIG. 3 stores data of the frequency channel determined to be usable.

Having described the case where the Bluetooth device shown in FIG. 3 achieves each circuit function shown in FIG. 4 by software processing using the CPU 23, the circuit functions can be achieved by configuring each circuit with the use of hardware.

The Bluetooth device performs communication control, from the management of the hopping patterns down, is wholly initiated by the master, monitors a packet error rate (PER) and determines an influence channel only on a master side, and can notify the stoppage of the use of the communication channel determined as the interference channel from the master to the slave.

Since the processing of the hopping control or the like in the Bluetooth device is performed by a protocol stack on a base band unit, the function of the aforementioned communication channel can be installed in the protocol stack of the base band unit. A packet error becoming a source to calculate the PER is detected from the error detection unit 48 in the reception unit 42 and received power is measured by the field strength measuring unit 47.

The communication channel control unit of the wireless LAN module does not have a function of finding out the communication channel interfering with other radio communication system such as the Bluetooth from among each communication channel used by the LAN module to stop the use of the communication channel and performing control to release the communication channel to other radio communication system.

Next to this, basic functions owned by each unit shown in FIG. 4 will be described schematically.

The higher layer protocol processor 45 performs assembly/disassembly of a packet, creates a packet of a Bluetooth link level from data to be communicated to transfer it to the transmission unit 41 and reproduces the data from the received packet having the Bluetooth link level.

The hopping frequency decision unit 44 selects one frequency channel to be used for radio communications from among a preset plurality of frequency channels and instructs the selected frequency channel with the lapse of a time.

The transmission unit 41 receives the packet data items from the higher layer protocol processor 45. The unit 41 allocates these data items the respective frequency channels sequentially selected by the hopping frequency decision unit 44. The unit 41 then transmits the packet data items, one by one.

The packet data reception unit 46 in the reception unit 42 receives packet data of the frequency channels sequentially instructed by the hopping frequency decision unit 44. The field strength measuring unit 47 measures strengths of reception fields of the frequency channels. When the head of the packet data could not be detected in the receiving operation by the packet data reception unit 46, the error detection unit 48 assumes this situation as a packet error in which packet data to be received originally cannot be received due to deterioration in channel quality.

The transmission/reception control unit 43 determines whether performs any one of a transmission operation, a reception operation and a field strength measuring operation at every slot each having 625 μs length defined by the Bluetooth or does not perform any of them. The transmission/reception control unit 43 instructs to the transmission unit 41, reception unit 42 and hopping frequency decision unit 44 and controls them to operate any one of the operations among each step shown in FIG. 5 to FIG. 8.

Next to this, in the radio communication system including the first and second Bluetooth device 11, 12, a summary of an example for a series of procedures to make radio communications will be taken to be explained.

The Bluetooth Protocol decides one device operating as a master among tow or more devices performing communications and makes the master side devices control data transmissions from devices operating as slaves. Here, the case where the first Bluetooth device 11 becomes a master side and the second Bluetooth device 12 becomes a slave side will be taken as an example to be described.

At first, the Bluetooth device 11 performs inquiry and paging in accordance with the Bluetooth Specification to find out the second Bluetooth device 12. After this, the first Bluetooth device 11 establishes a connection toward the second Bluetooth device 12 to transfer user data thereto by using the connection.

After proceeding this series of procedures, the summary of operations of the Bluetooth device in actual communications of the user data is described as follows. In this case, the first and second Bluetooth devices 11, 12 operate similarly.

The higher layer protocol processor 45 creates the packet with the Bluetooth link level from data to be transferred. The packet is transferred to the transmission unit 41 to be transmitted through a frequency specified by the hopping frequency decision unit 44. On the other hand, during the establishment of the connection, the reception unit 42 receives the frequency specified by the hopping frequency decision unit 44 to reproduce the packet and transfers it to the higher layer protocol processor 45.

Sending of radio waves from the access point 13 of the wireless LAN located in the vicinity of the Bluetooth device causes mutual communications between the Bluetooth devices 11 and 12 to be influenced. This fact is recognized as an increase in an error inspection rate by the error detection unit 48 included in the reception unit 42 and an increase in field strength of a channel not expected by the Bluetooth device. Based on the information with respect to the above-mentioned recognition, the hopping frequency decision unit 44 detects interference between the Bluetooth device and the access point 13 of the wireless LAN to decide a channel to be used.

Figure 5:
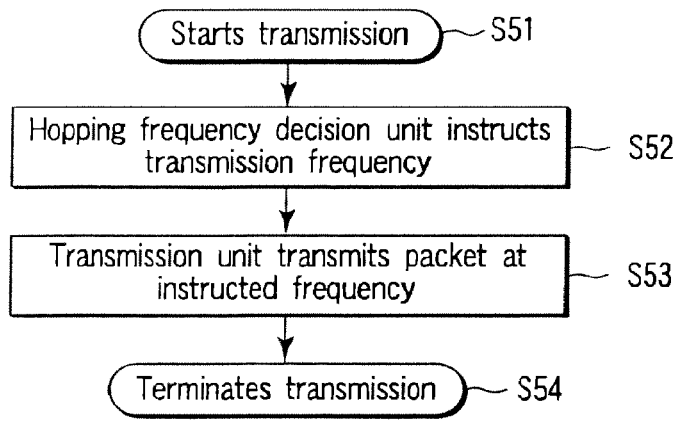
FIG. 5 is a flowchart showing a basic transmission procedure executed, under control through a transmission/reception control unit in FIG. 4, for transmitting packet data.
Figure 7:
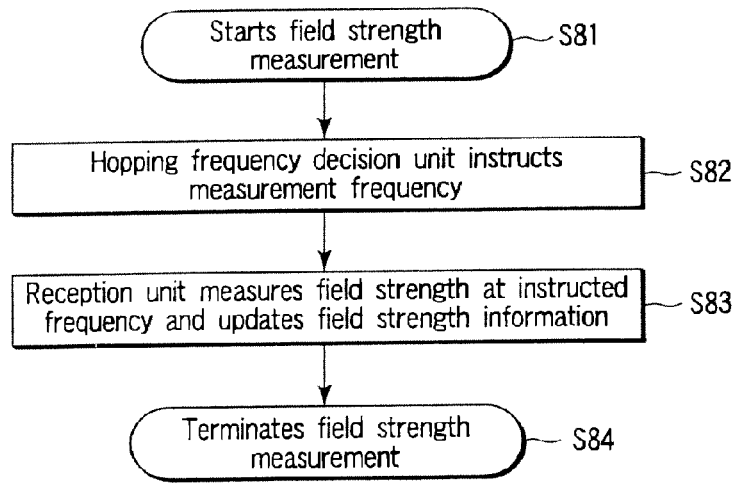
FIG. 7 is a flowchart showing a field strength measuring procedure executed under control by transmission/reception control unit in FIG. 4.
Figure 6:
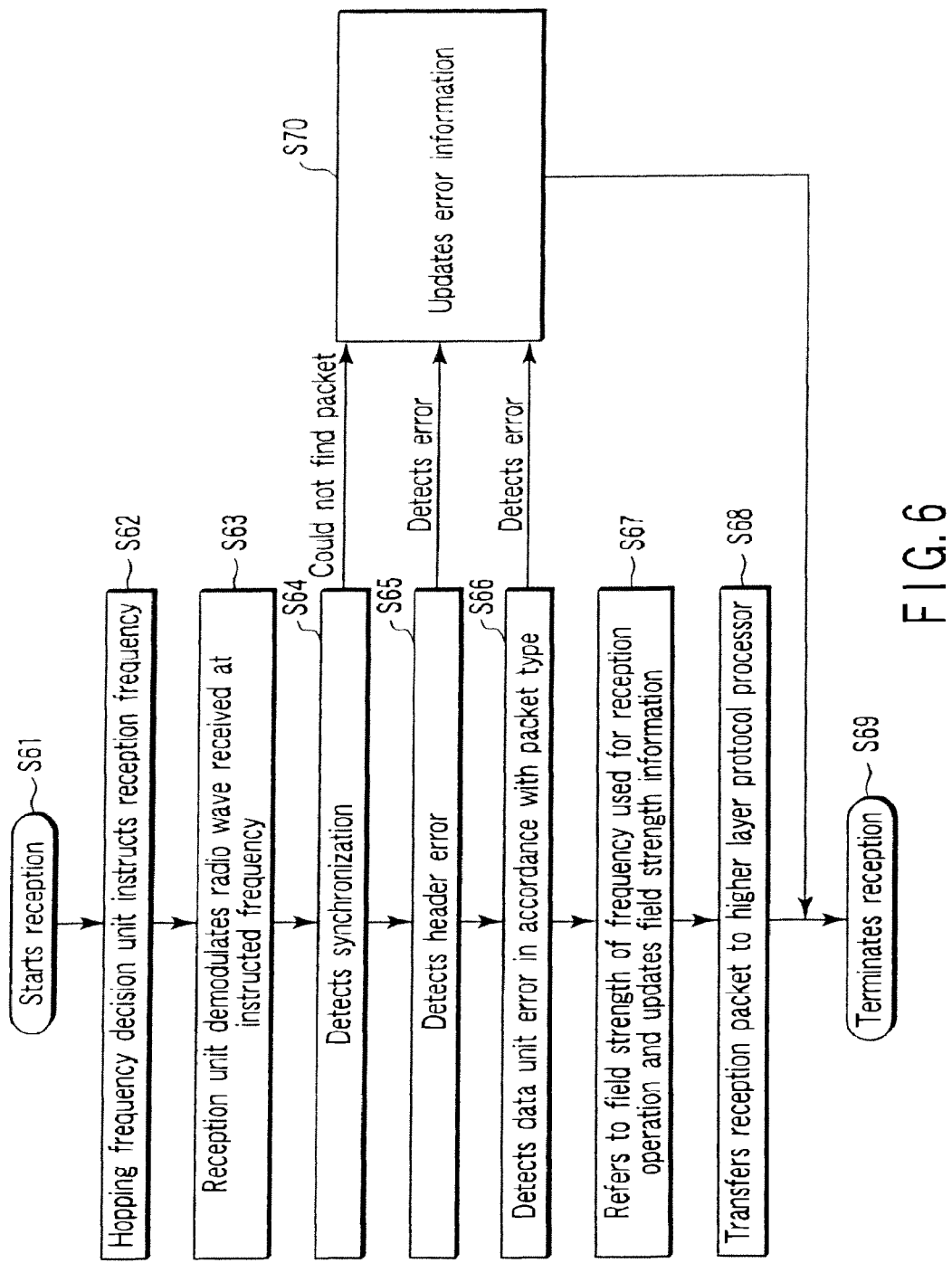
FIG. 6 is a flowchart showing a basic transmission procedure executed, under control through transmission/reception control unit in FIG. 4, for receiving packet data.
Figure 8:
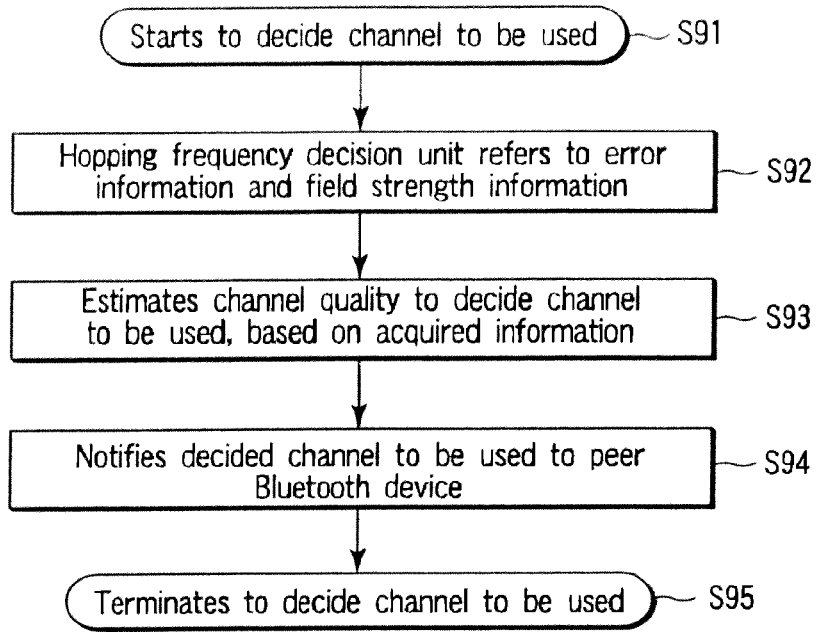
FIG. 8 is a flowchart showing a basic procedure deciding a channel to be used, executed under control by transmission/reception control unit in FIG. 4.

From FIG. 5 to FIG. 8 are the flowcharts schematically showing each one example of basic operations of the Bluetooth device shown in FIG. 4. FIG. 5 is an exemplary flowchart showing a transmission procedure when the transmission unit 41 of the Bluetooth device transmits packet data, FIG. 6 is a flowchart showing a reception procedure when the reception unit 42 receives the packet data, FIG. 7 is a flowchart showing a field strength measuring procedure when the field strength measuring unit 47 measures a field strength, and FIG. 8 is a flowchart showing a decision procedure of a channel to be used when the hopping frequency decision unit 44 decides a channel to be used.

The Bluetooth standards define a time slot with a length of 625 μs. The transmission/reception control unit 43 of the Bluetooth device determines whether any one of the transmission operation, reception operation and field strength measuring operation at every slot should be performed or none of them should be performed. The transmission/reception control unit 43 then issues instructions to the transmission unit 41, reception unit 42 and hopping frequency decision unit 44 to make them execute operations of each step shown in any of FIG. 5 to FIG. 8.

(A) Basic Operations in the Transmission of the Packet Data (Flowchart in FIG. 5)

When the transmission of the packet data is started (step S51), at first, the hopping frequency decision unit 44 instructs the transmission frequency to the transmission unit (step S52). The transmission unit 41 modulates, with the specified frequency, the packet data supplied from the higher layer protocol processor 45 to transmit it (step S53). When completing the transmission of the supplied packet data, the transmission unit 41 terminates the transmission operation (step S54).

(B) Basic Operations in the Reception of the Packet Data (Flowchart in FIG. 6)

When the reception of the packet data is started (step S61), at first, the hopping frequency decision unit 44 instructs the reception frequency to the reception unit 42 (step S62). The reception unit 42 performs a packet reception operation with the specified frequency. Specifically, the reception unit 42 receives a radio wave of the specified frequency to demodulate it (step S63). After this, the reception unit 42 searches Sync Word of a preset pattern from the demodulated data to detect the head of the packet data (step S64). When detecting the head of the packet data, the reception unit 42 proceeds to a step S65. If the reception unit 42 could not find a packet, the reception unit 42 proceeds to a step S70 and updates error information showing the fact that synchronization detection could not be completed to terminate the reception operation. If the head of the packet data could be detected, the error detection unit 48 performs error detection/correction of a header section by using error detection/correction codes included in the header section in the step S65. Wherein, if an error exceeding an ability of the error detection/correction code is detected, the reception unit 42 proceeds to a step S70 to update error information showing the fact that a header error was detected but the error could not be corrected then terminate the reception operation.

When any error was not found in the header section or even when the error was found but it was corrected successfully, the error detection unit 48 detects the error of data section in a step S66. In this case, at first, the detection unit 48 refers to information included in the header section to recognize the packet type. In the case of the Bluetooth, error detection/correction codes to be used are set up for each packet type and the reception unit 42 conducts the error detection/correction operation for data section in accordance with the codes. When an error was not detected or even when the error was detected but it was corrected successfully, the step S66 shifts to a step S67. When the error was detected and it could not be corrected completely, the step s66 shifts to the step 70 then updates the error information showing the fact that the error was detected but it could not be corrected to terminate the reception operation. Further, some of the packet types do not include the error detection/correction codes in the data sections. Such types of the packets are not performed to detect their errors in the data sections and the step S66 shifts to the step S67.

As the result of the error inspection for the data section, if the error was not detected or even if it was detected but corrected successfully, the reception unit 42 refers to the measurement result from the field strength measuring unit 47 to update field strength information of a carrier wave by which the packet now in receiving has been carried (step S67). The measuring unit 47 measures the strength of radio wave demodulated in the step S63 in accordance with a prescribed method to update its value. The measuring unit 47 can adopt a variety of types of field strength measuring methods therefore; however the types do not affect any influence onto effectiveness of the present invention, so that the description about the reception operation will be continued without any limitation.

At the last step of the reception operation, the reception operation transfers the packets which were processed thereby up to now to the higher layer protocol processor 45 (step S68) and terminates itself (step S69).

(C) Basic Operations in the Field Strength Measurement (Flowchart in FIG. 7)

When the field strength measurement is started (step S81), at first, the hopping frequency decision unit 44 instructs a frequency to measure the field strength (step S82). The field strength measuring unit 47 measures the field strength of the instructed frequency, and when completing the measurement, the reception unit 42 refers to the measured value from the measuring unit 47 to update field strength information (step S83). Concluded, the field strength measurement unit 47 is terminated (step S84).

(D) Basic Operations in the Decision of the Channel to be Used (Flowchart in FIG. 8)

The operations in the decision of the channel to be used is different from the foregoing transmission operation, reception operation and field strength measuring operation and not performed at every 635 μs slot. But the operations are instructed to be executed with a pre-determined interval, for example, 10-second interval, by the transmission/reception control unit 43 of the Bluetooth device in order to control the operations of the hopping frequency decision unit 44. When the decision operation of the channel to be used is started in accordance with the instruction from the transmission/reception control unit 43 (step S91), the hopping frequency decision unit 44 refers to the error information stored in the error detection unit 48 and the field strength information stored in the field strength measuring unit 47 (step S92). The hopping frequency decision unit 44 then estimates a channel quality on the basis of the acquired information to decide the channel to be used (step S93). At last, the hopping frequency decision unit 44 notifies the channel to be used to the Bluetooth device on the other party (step S94) to terminate the operations (step S95).

The operations to decide the channel to be used are conducted by the master side device in accordance with the Bluetooth Protocol. In the step S94, information on the channel decided to be used is notified from the master side device to the slave side device.

As mentioned above, the operations in the steps S64, S65 and S66 in FIG. 6 are those that the reception unit 42 reproduces a packet from the received radio wave. If the channel quality of the channel which has transmitted the packet is deteriorated, the possibility of occurrence of a failure in a reproduction of the packet increases. When the reception unit 42 failures to reproduce the packet from the radio wave received at a certain slot, types of failures are considered as follows.

(A) Synchronization Error (Sync Error)

This error occurs when the retrieval of the Sync Word executed in the synchronization detecting step (step S64) times out. In this case, the packet is not detected.

(B) Header Error

This error occurs when an error is detected in the header error inspection step (step S65) and the error exceeds the ability of the correction code. In this case, the packet is discarded.

(C) Data Section Error

This error occurs when an error is detected in the data section error inspection step (step S66) and the error exceeds the ability of the error correction code. In this case, the packet is discarded.

When these errors occur, the information is classified and stored for each error type and for each channel to be used in the error information update step (step S70) to be used in the decision operations of the channel to be used.

For the Bluetooth device in the first embodiment, the following functions achieved through software by the CPU 23 by using the program stored in the memory 22 in FIG. 3 is added to the transmission/reception control unit 43.

(1) Channel Quality Estimation Function

This function calculates packet error rates for each packet from the number of times of packet data reception operations conducted for each frequency channel and the number of times of packet errors detected from the error detecting unit 48 when estimating each channel quality of the frequency channels received from the packet data reception unit 46 and estimates channel quality by using the packet error rates.

(2) Frequency Channel Selection Function

This function determines whether or not the frequency channel is usable on the basis of the estimation result from the channel quality estimation function and controls the hopping frequency decision unit 44 to make it perform frequency hopping while avoiding the frequency channel which has been determined unusable.

Figure 9:
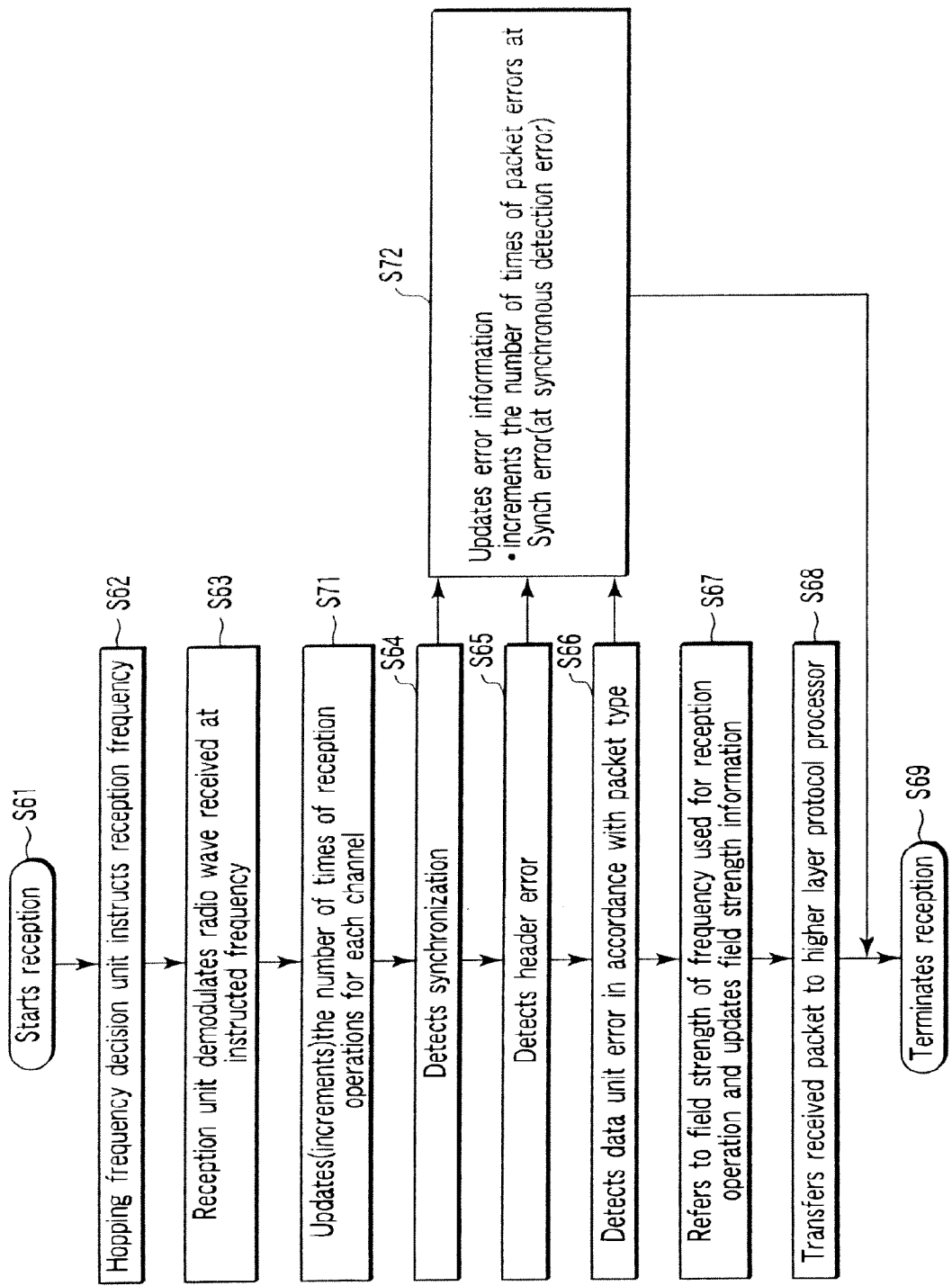
FIG. 9 is a flowchart showing a reception procedure executed, by the Bluetooth device in the first embodiment, for receiving packet data.

In the Bluetooth device of the first embodiment, a new step S71 is added as shown in a flowchart in FIG. 9, in addition to the basic operations shown in the flowchart in FIG. 6 when the reception unit 42 receives the packet data.

That is, when estimating the quality of the channel to be used by the Bluetooth device itself by using the Active system, the Bluetooth device estimates each channel quality on the basis of the error rates of the packets in communications. However, even when the Sync Error occurs, if it is assumed that the packet to be originally transmitted cannot be received because of deterioration in quality of the channel which has been used in the reception operation, Sync Error information can be also used to estimate the channel quality.

More specifically, the Bluetooth device calculates the packet error rate in the following method. The error detecting unit 48 counts the number of times of the reception operations for each channel to update (increment) it at every time (step S71). Furthermore, when the Sync Error is detected in the step S64, the number of times of the packet errors is incremented in the step S70.

When the Header errors are detected in the step S65, the number of times of the Header errors in the corresponding channels is incremented in the step S70. When the data section errors are detected in the step S66, the number of times of the data section errors in the corresponding channels may be incremented in the step S70.

Figure 10:
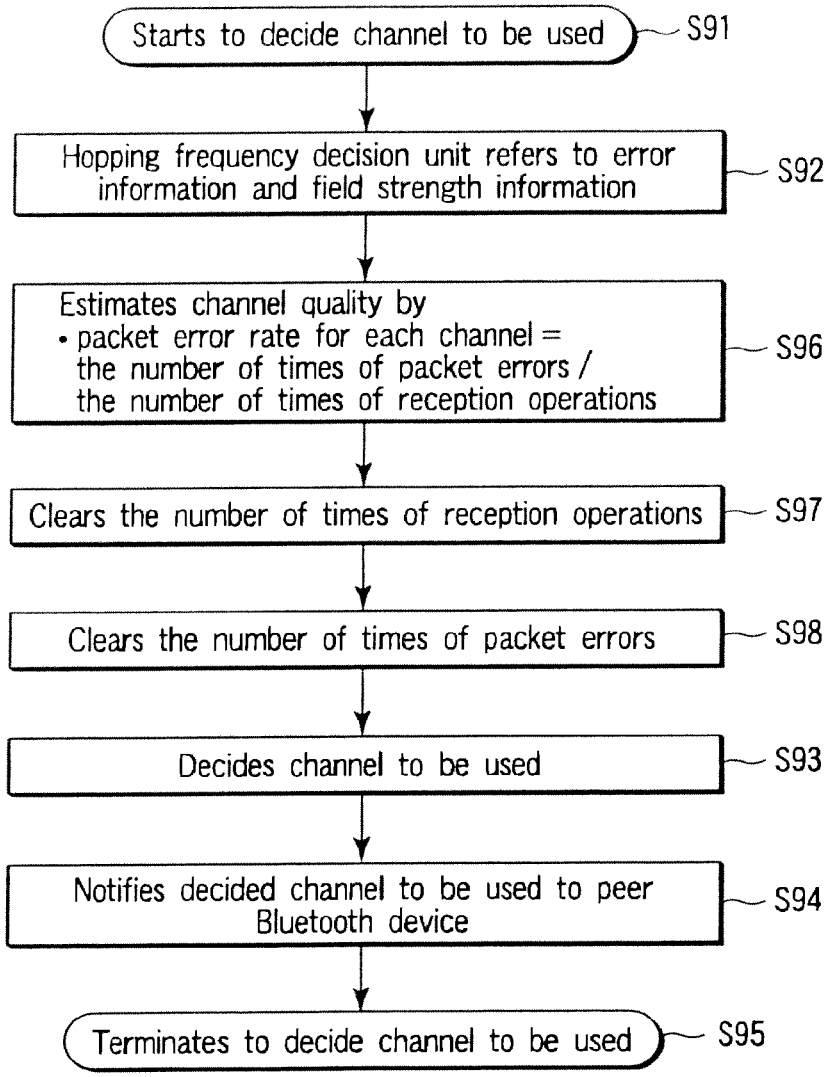
FIG. 10 is a flowchart showing a procedure deciding a channel to be used, executed by the Bluetooth device in the first embodiment.

The procedure deciding the channel to be used adds new steps S96 to S98 as shown in a flowchart in FIG. 10 in addition to the basic operations shown in the flowchart in FIG. 8. At first, the transmission/reception control unit 43 instructs to start the operation deciding the channel to be used (step S91), then, the hopping frequency decision unit 44 refers to the error information and field strength information stored in the error detecting unit 48 and field strength measuring unit 47 (step S92). Next, the channel quality is estimated on the basis of the acquired information to decide the channel to be used. In the flowchart in FIG. 10, the step S96 calculates the packet error rates for each channel by dividing the number of times of the packet errors by the number of the times of the reception operations to estimate the channel quality, based on the calculation result. Then, the number of times of the reception operations is cleared (step S97), and further, the number of times of the packet errors is cleared (step S98). After this, the channel to be used is decided (step S93). At last, the transmission/reception control unit 43 notifies the channel to be used to the Bluetooth device on the peer side (step S94) to terminate the operations (step S95).

That is, in the flowchart shown in FIG. 10, by dividing the number of the packet errors by the number of the times of the reception operations from the time point when the last packet error rates of each channel were calculated, the packet error rates of each channel are calculated. After calculating the packet error rates, the error detecting unit 48 clears the data of the numbers of times of the reception operations and Sync Errors. Wherein, if the number of the times of the reception operations from the time point when the last packet error rates of each channel were calculated is smaller than a predetermined value, if accuracy of the packet error rates based on the value is poor and if it is determined that erroneous determinations occur frequently, the error detecting unit 48 may not calculate the packet error rates and may not clear the data to use the packet error rates calculated at the list time. Or, the error detecting unit 48 may use the below-mentioned packet error indexes as substitute for the packet error rates.

Japanese Patent Application No. 2003-362198 entitled 'FREQUENCY HOPPING RADIO DEVICE' of the prior application by the present assignee discloses a technique as an example of the channel quality evaluation method for measuring the frequency by which received signal strength indication (RSSI) values exceed a prescribed threshold value to determine whether or not the frequency exceeds a prescribed determination reference by continuously monitoring the RSSI values for each channel. The first embodiment may adopt this technique. The aforementioned Japanese patent Application No. 2003-362198 also discloses a technique as another example of the channel quality evaluation method for measuring the frequency by which the errors of the received data in the selected each frequency channel to determine whether or not the frequency exceeds a prescribed determination reference. The first embodiment may also adopt this technique.

Usually, as described in the specification of the prior application, usual data section errors may be counted to grasp the packet errors. However, the Bluetooth performs a packet communication, so that it is required for the detection of the data errors to receive the error correction codes included in the packet. This fact means that the data section errors cannot be detected without the normal reception of the packet. Therefore, when the data section errors are counted, the frequency normally receiving packets capable of counting data section errors of a subject to be measured becomes smaller. Accordingly, a time needed to complete the channel quality evaluation in a bad environment such that packet synchronization is unusable becomes elongated. That is, the Sync Errors frequently occur in a bad radio wave environment such that packet synchronization is unusable, and as a result, the number of received packets per unit time, arriving at the Header Errors inspection step (S65) and Header Section Errors inspection step (S66), becomes smaller. Therefore, the time, required until packets with the number needed to the error rate calculations in the Header Error inspection step (S65) and data section error inspection step (S66), becomes longer.

According to the first embodiment, the Bluetooth device focuses an attention on the Sync Errors so as to grasp packet errors to assume that the Sync Errors indicate no reception of the packet to be originally transmitted and uses the result in which the Sync Errors are counted as the number of times of the packet errors for the calculation of the packet error rates. Accordingly, since the Bluetooth device can prevent the reduction in the number of the received packets per unit time to calculate the packet error rates to quickly detect a change of the channel qualities, the Bluetooth device can avoid a situation where a required time until the end of the channel quality evaluation in the foregoing bad environment is lengthened.

(Second Embodiment)

Next the second embodiment will be described. In the second embodiment, when estimating the channel quality to decide the channel to be used, the Bluetooth device estimates the channel quality of the channel which is assumed that its quality is excellent and used in the reception operation by calculating its packet error rate. When the packet error rate becomes larger than the predetermined value (threshold value), it is assumed that the channel quality is deteriorated and the use of the channel is stopped. On the contrary, the channel of which the quality is seemed to be poor and which is not used in the reception operation is sequentially measured its field strength and when the field strength is lowered, it is assumed that its quality becomes excellent and the use thereof is started again.

Figure 11:
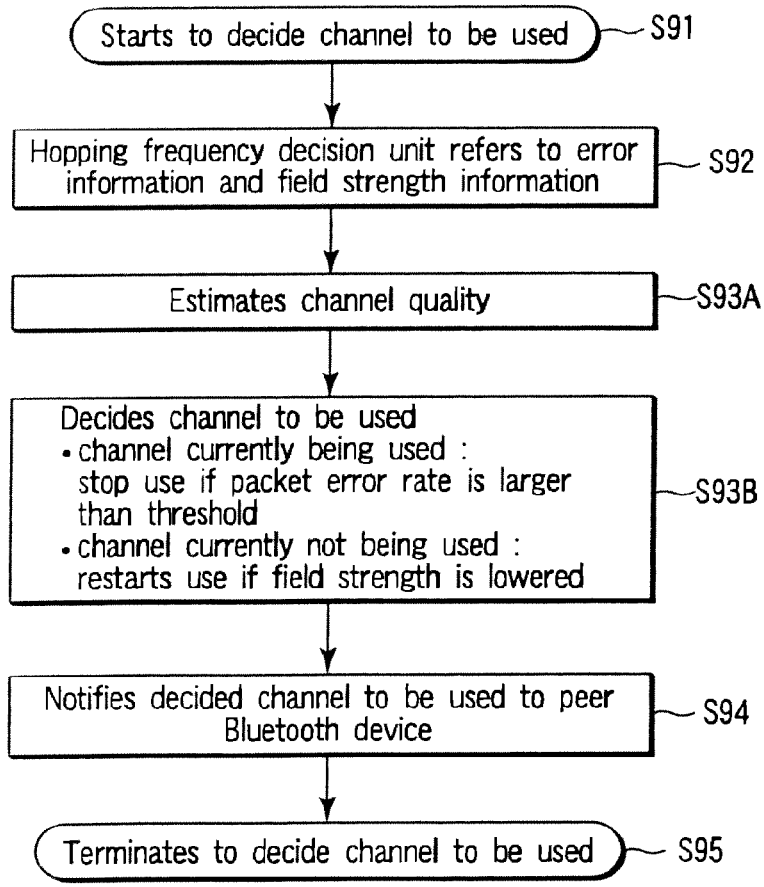
FIG. 11 is a flowchart showing a procedure deciding a channel to be used, executed by the Bluetooth device in a second embodiment.

A flowchart in FIG. 11 shows the procedure deciding the use of the channel to be used in the second embodiment. The flowchart of FIG. 11 differs from that of FIG. 8 at the point that one step S93 among FIG. 8 is divided into two steps S93A and S93B. Other points are the same as those of FIG.

8. The step 93A estimates the channel quality. In the next step S93B, when deciding the channel to be used, with respect to the channel currently in use, if the value of the packet error rate thereof is larger than the threshold value, the use of the channel is stopped, and with respect to the channel not in use now, if the field strength thereof is lowered then the use of the channel is started again.

When the number of channels to be used by the Bluetooth device is reduce and the mutual interference among the Bluetooth devices become not negligible, it is needed to select a channel to be newly used among channels which have not been used. According to the second embodiment, the Bluetooth device can estimate the channel quality without sending any packet to the channel which has been seemed not to be excellent in quality.

Accordingly, when deciding the reuse of the channel among the channels which were previously seemed to be poor in quality while minimizing increase in power consumption resulting from the adoption of the Passive system, the Bluetooth device can estimate the channel quality without affecting adverse effects onto the communication of the user data.

(Third Embodiment)

Figure 12:
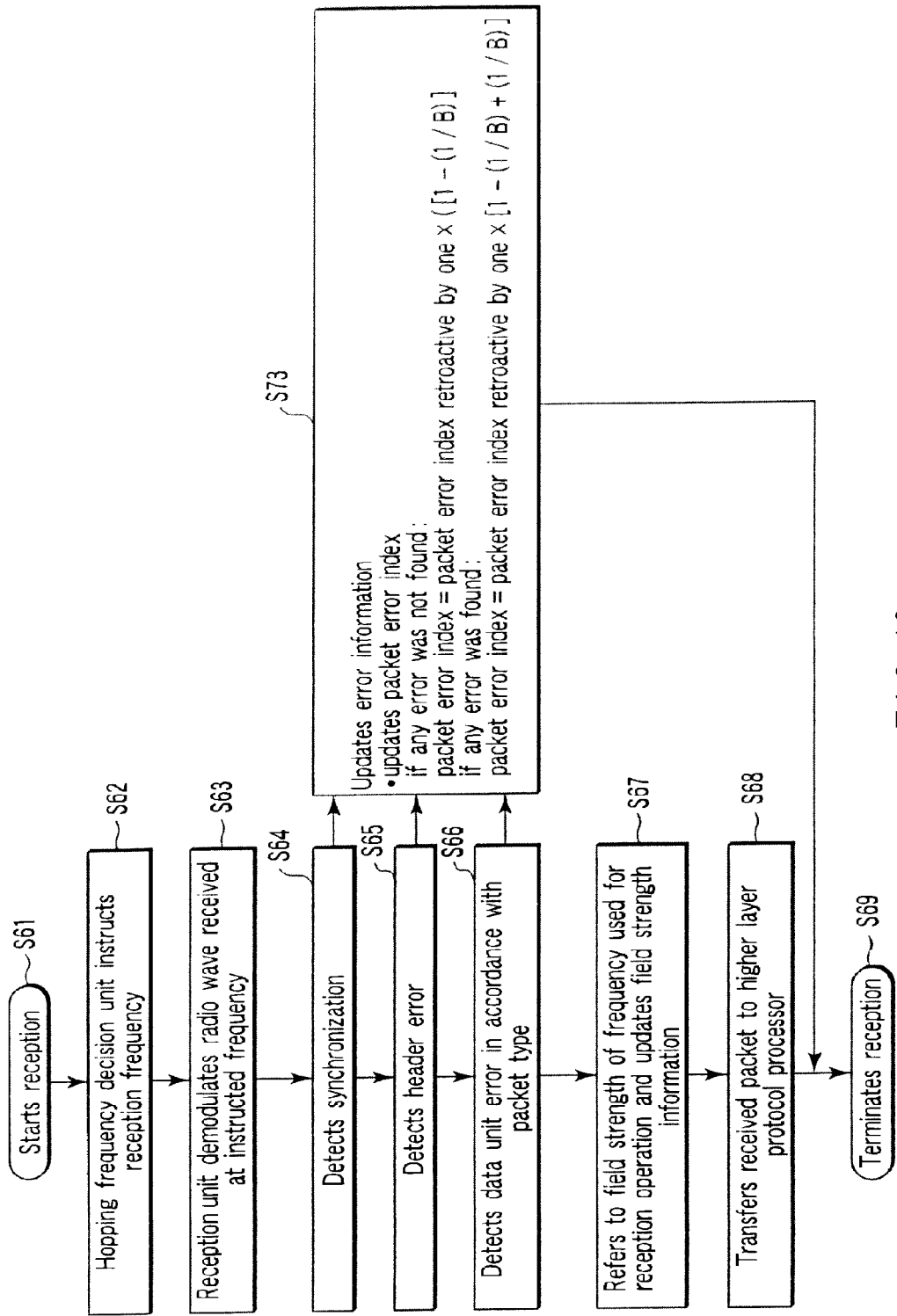
FIG. 12 is a flowchart showing a procedure deciding a channel to be used, executed by the Bluetooth device in a third embodiment.

Next, the third embodiment will be explained. A flowchart in FIG. 12 shows the reception procedures in the third embodiment. The step S70 in the flowchart in FIG. 6 showing the basic reception operation procedures stores the number of times of the reception operations for each channel and the number of times of errors for each type so as to calculate the packet error rates in the update of error information. On the other hand, in the step S72 of the flowchart in FIG. 12, the packet error index is defined as follows. Then, the Bluetooth device seems the packet error index as the packet error rate to estimate the channel quality. Other operations are the same as those of the flowchart in FIG. 6.

(A) If any error is not found in the packets received in the reception operations, the packet error index is updated as follows.

'packet error index=packet error index retroactive by one×[1−(1/$B$)]($B$ is predetermined positive number, 1/$B$ is value of 0 to 1)'

(B) If any error is found in the packet received in the reception operations, the packet error index is updated as follows.

'packet error index=packet error index retroactive by one×[1−(1/$B$)]+(1/$B$)'

In the third embodiment, the packet error index may calculate and update by using any one of the Sync Errors, Header Errors and Data Section Errors. For example, the packet error index can be calculated and updated by using only the result of the Sync Errors. Or the packet error index can be calculated and updated by using all Sync Errors, Header Errors and Data Section Errors. The packet error index can be calculated and updated by using all of the result of the Sync Errors, Header Errors and Data Section Errors.

According to the third embodiment, the packet error rate can be calculated approximately only by storing only one variation. Accordingly, it is possible to calculate the packet error rate by minimizing a necessary calculation resource.

(Fourth Embodiment)

Next, the fourth embodiment will be described. In the fourth embodiment, when estimating a quality of a certain channel, the Bluetooth device starts to estimate the channel quality depending on a calculation result of the packet error rate after performing receiving operations of packets in the corresponding channel by the predetermined number of times. After this, the packet rates are calculated at every packet reception operation to update estimation of the channel qualities.

Figure 13:
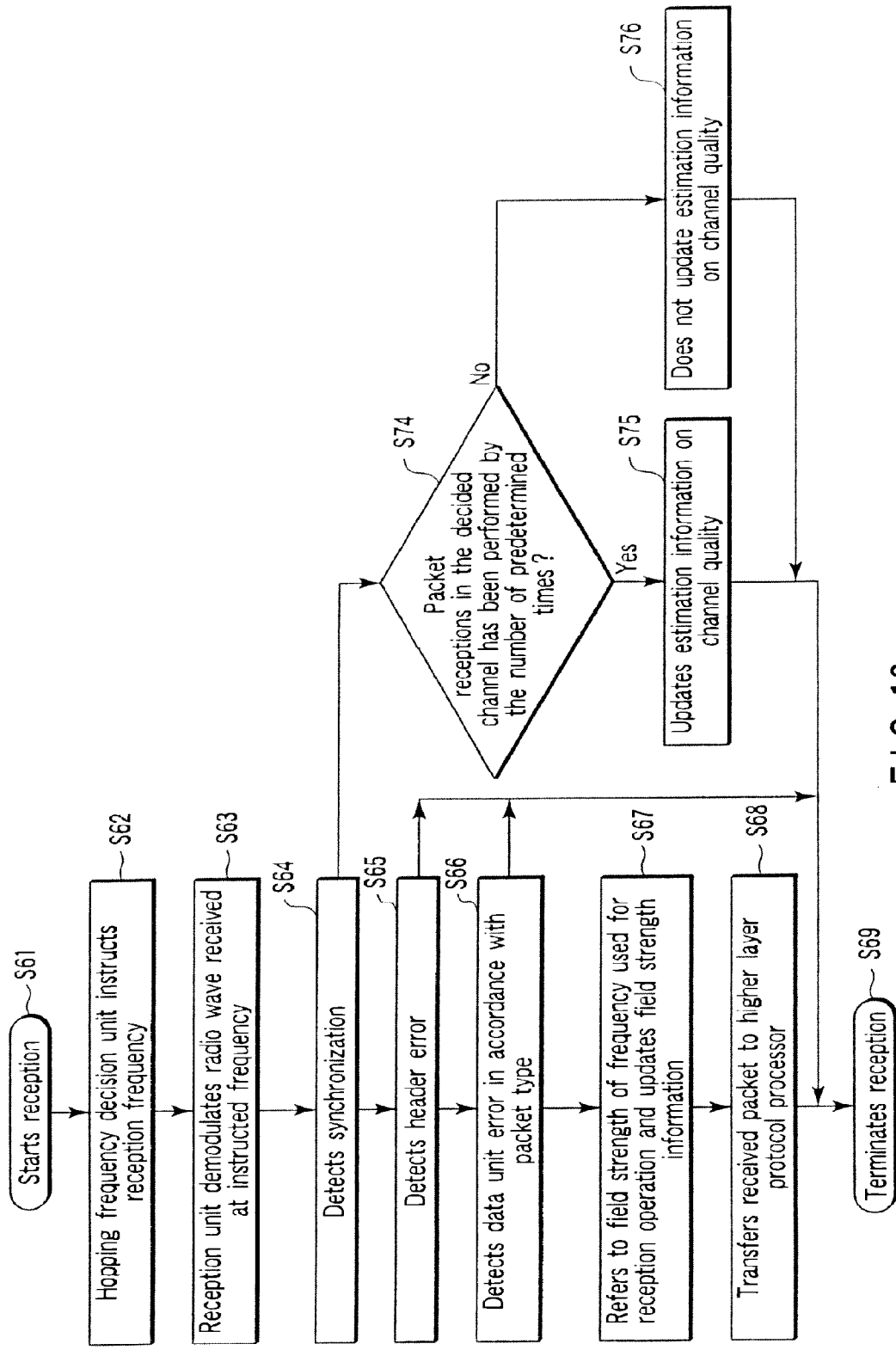
FIG. 13 is a flowchart showing a procedure deciding a channel to be used, executed by the Bluetooth device in a fourth embodiment.

The reception procedures in the fourth embodiment are shown in a flowchart in FIG. 13. In the fourth embodiment, the step S70 in the reception operation procedures shown in the flowchart in FIG. 6 are replaced for three steps S73 to S75. Other steps are the same as those of the flowchart in FIG. 6. If the head of the packet data is not found in the step S64, it shifts to the step S73. The step S73 determines whether or not the Bluetooth device conducts the packet reception in the corresponding channel by the prescribed number of times. The packet reception is conducted, the step S73 shifts to the step S74 and updates estimation information of the channel quality to terminate the reception operations (step S69). Otherwise, the step S64 shifts to the step S75 and does not update the estimation information of the channel quality to terminate the reception operations (step S69).

That is to say, in the fourth embodiment, when estimating a quality of a certain channel, the Bluetooth device starts the estimation of the channel quality on the basis of the calculation results of the packet error rates after performing the packet reception operations in the corresponding channel by the number of predetermined times. After this, the Bluetooth device calculates the packet error rates at every performance of the packet reception operations to update the estimation of the channel quality.

According to the fourth embodiment, the packet error rate after conducting the packet reception operations by the number of predetermined times, namely, after entering statistical balance can be calculated. Consequently, the channel quality can be estimated by the packet error rate after entering the statistical balance and stable channel quality estimation can be achieved.

Having described the case where the channel quality is estimated and updated by using only information on the Sync Errors, the Bluetooth device may estimate and update the channel quality by suing any information of the Sync Errors, Header Errors and Data Section Errors. The Bluetooth device can update one item of the equality estimation information by using any two items of information, and further, the Bluetooth device can update individual items of quality estimation information corresponding to each error by using each item of error information of the Sync Errors, Header Errors and Data Section Errors.

(Fifth Embodiment)

Next, the fifth embodiment will be described. In the fifth embodiment, the Bluetooth device measures the packet error rates and the field strengths at idle slot time in parallel for each channel. Then, if it is not considered that a value with high reliability could be obtained by taking the number of times of the field strength measurements into account when deciding a channel to be used, the Bluetooth device decides the channel to be used with the use of the packet error rates.

Figure 14:
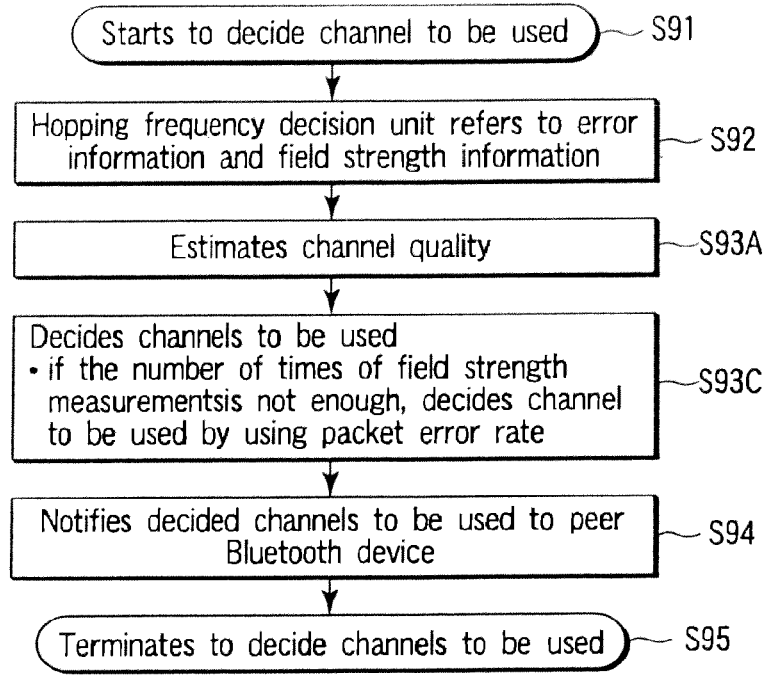
FIG. 14 is a flowchart showing a procedure deciding a channel to be used, executed by the Bluetooth device in a fifth embodiment.

A flowchart in FIG. 14 shows the procedure deciding the channels to be used in the fifth embodiment. The procedure deciding the channels to be used shown in FIG. 14 is different in a point that the one step S93 in the basic operation shown in FIG. 8 is divided into two steps S93A and S93C. Other points are the same as those of the flowchart in FIG. 8. The step S93A estimates the channel quality. In the next step S93C, when the channels to be used is decided, if the number of times of the field strength measurements is not sufficient, the channels to be used are decided by using the packet error rates.

In the fifth embodiment, the Bluetooth device may decide the channels to be used with the use of field strength information, or decide it by using the packet error rates, and further, may decide it with combinations of the strength information and packet error rates.

According to the fifth embodiment, it is not necessary to use a field strength measurement result with low reliability in deciding the channel to be used even when reliability in channel quality estimation is low.

Accordingly, the Bluetooth device can stably decide the channel to be used, based on the channel quality estimation result with high reliability, which is estimated from communication of user data.

(Sixth Embodiment)

In the sixth embodiment, the field strength measurement result at idle slots and actual packet error rates of each channel are associated with one another in advance, and when estimating the channel quality from the measurement result, the Bluetooth device determines that the quality is very bad or good when the measured field strengths are higher or lower than the field strengths being the predetermined packet error rates, respectively.

Figure 15:
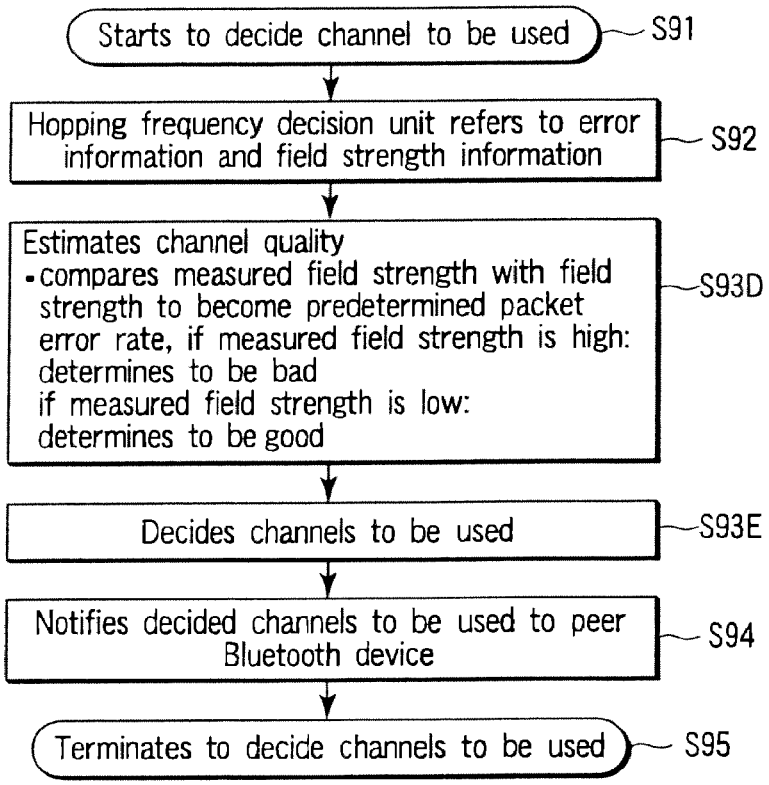
FIG. 15 is a flowchart showing a procedure deciding a channel to be used, executed by the Bluetooth device in a sixth embodiment.

A flowchart in FIG. 15 shows the procedure deciding the channels to be used in the sixth embodiment. The procedure deciding the channels to be used shown in FIG. 15 is different in a point that the one step S92 in the basic operation shown in FIG. 8 is divided into two steps S93D and S93E. Other points are the same as those of the flowchart in FIG. 8.

The step S93D estimates the channel qualities as follows. That is, the step S93D compares the measured field strengths with the field strengths to be predetermined packet error rates. As a result, if the measured field strengths are higher, the channels are determined to be low in quality, and if the measured field strengths are lower, the channels are determined to be high in quality. In the next step S93E, the channels to be used are decided on the basis of the determination result.

Having estimated the channel qualities by using only the field strengths, the step S93D may estimate the channel quality with the use of the combination of the field strengths and packet error rates.

According to the sixth embodiment, the channel quality can be estimated by taking influence of background noise on the packet error rates into consideration. Consequently, the Bluetooth device can estimate the channel quality with higher reliability by taking into account the influence of field strengths at idle slots upon actual communications.

(Seventh Embodiment)

In a state in which a large number of Bluetooth devices make communications, if the number of channels to be used hopping operation is not sufficient, the probability of occurring interference among different Pico nets becomes higher. Therefore, it is preferable for the Bluetooth devices to define the lowest limit number of channels to be used (minimum channel to be used) in AFH operations to secure the number.

In the seventh embodiment, the Bluetooth device calculates packet error rates of each channel from the number of times of the reception operations and of the packet errors at each channel, respectively, and sequentially selects channels of the predetermined number in ascending order of packet error rates, namely in descending order of channel qualities, supposing that the packet error rates represent the channel qualities. In actual communications, the selected channel is used.

Figure 16:
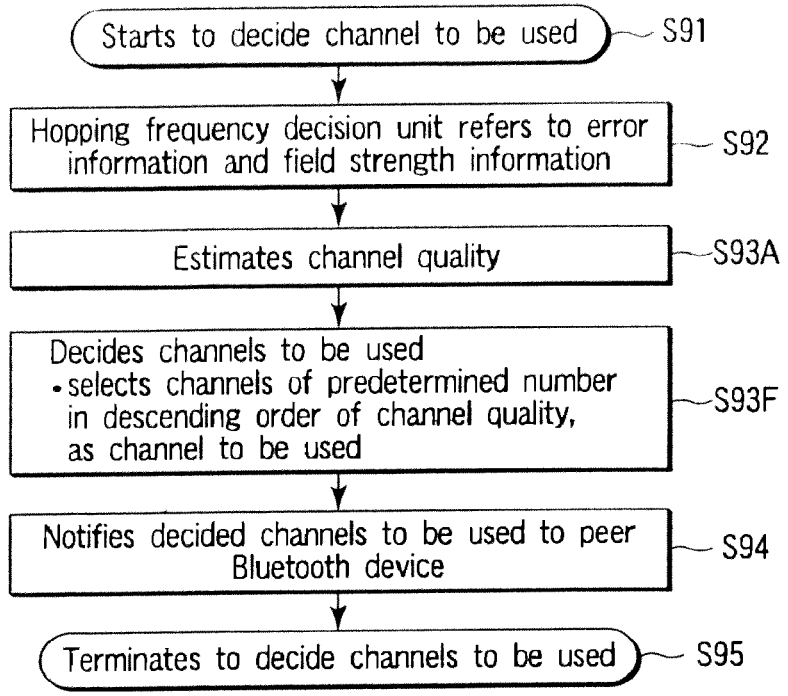
FIG. 16 is a flowchart showing a procedure deciding a channel to be used, executed by the Bluetooth device in a seventh embodiment.

A flowchart in FIG. 16 shows the procedure deciding the channels to be used in the seventh embodiment. The procedure deciding the channel to be used shown in FIG. 16 is different in a point that the one step S93 in the basic operation shown in FIG. 8 is divided into two steps S93A and S93F. Other points are the same as those of the flowchart in FIG. 8. The step S93A estimates the channel quality. The next step S93F selects channels of the predetermined number in descending order of channel qualities.

According to the seventh embodiment, the lower limit value of the number the channels to be used even when the channel qualities are deteriorated all over the ISM band. Therefore, a plurality of Bluetooth devices can maintain a small possibility to transmit with the same frequency when they transmit independently with one another in a narrow area.

Further, in the seventh embodiment, having used the packet error rates of each channel, which have been calculated from the number of times of the reception operations and the number of the packet errors in each channel, by supposing that the packet error rates represent the channel qualities, it is also possible to use, for example, the packet error indexes used in the third embodiment and other indexes.

(Eighth Embodiment)

It is necessary to be assumed that the Bluetooth device is carried by a user. Therefore, the access points of the wireless LAN being interference sources vary with the lapse of a time. In general, to prevent interference among access points of the wireless LAN, adjacent access points use frequencies different from each another. In such a situation, if the Bluetooth device now performing frequency hopping by avoiding a frequency currently used by a certain access point A is carried to be moved to a site near another access point B, the Bluetooth device operates so as to also avoid the frequency currently used by the access point B.

In the eighth embodiment, repeated above-mentioned operations cause the usable channels not to remain. To avoid such a situation, when the quality of the channel now in use is deteriorated, it is assumed that the Bluetooth device has moved into an environment with a different radio wave or regulation. Then, it becomes possible to use channels which have been assumed that they have bad qualities, so that the Bluetooth device starts to use again the channels which have not been used because they had been determined that they are deteriorated in quality.

Figure 17:
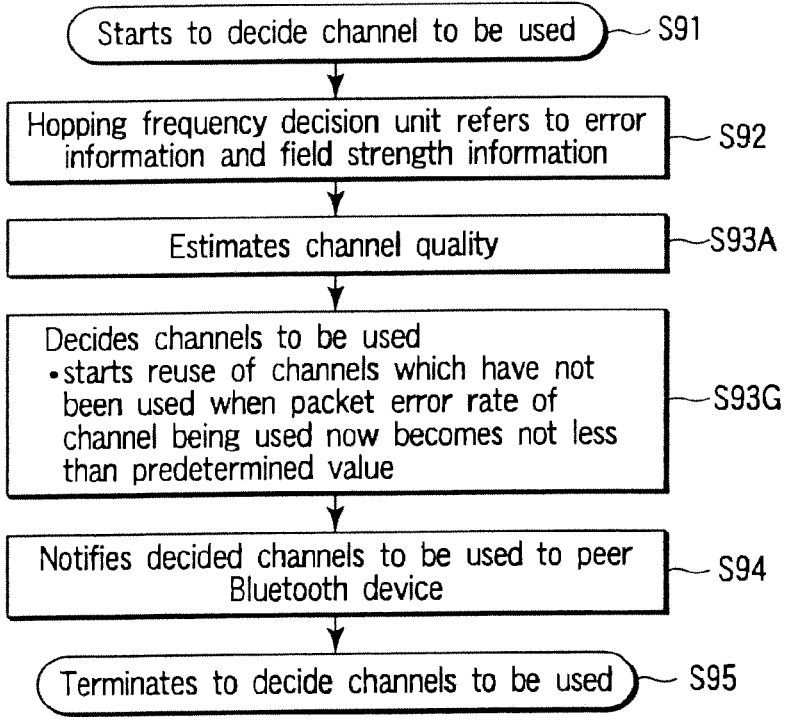
FIG. 17 is a flowchart showing a procedure deciding a channel to be used, executed by the Bluetooth device in an eighth embodiment.

A flowchart in FIG. 17 shows the procedure deciding the channel to be used in the eighth embodiment. The procedure deciding the channel to be used shown in FIG. 17 is different in a point that the one step S93 in the basic operation shown in FIG. 8 is divided into two steps S93A and S93G. Other points are the same as those of the flowchart in FIG. 8.

That is to say, the Bluetooth device calculates the packet error rates on the basis of the error detection in packet reception operations to estimate the channel quality (step S93A). Next, in the case of decision of a channel to be used in response to the estimated channel quality, the Bluetooth device starts to use again channels which have not been used due to the previous decision of their deterioration in quality, when the packet error rate of the channel currently used becomes larger than a prescribed value (step S93G).

According to the eighth embodiment, the Bluetooth device determines starts to use again the channels which have not been used due to the previous determination of their deterioration in quality. Therefore, it is assumed that the Bluetooth device or the device to be an interference source moves to establish a new radio environment and a channel to be use newly can be selected.

(Ninth Embodiment)

In the aforementioned eighth embodiment, supposing that the change in the packet error rates accompanying by the lapse of a time is not so extreme, the possibility becomes higher, which the packet error rates in the channels of which the packet error rates were not deteriorated so much among channels which had been determined no to be used.

In the ninth embodiment, the Bluetooth device selects the channel to start the use again, in ascending order of packet error rates of the channels when the channels were brought into no longer use.

Figure 18:
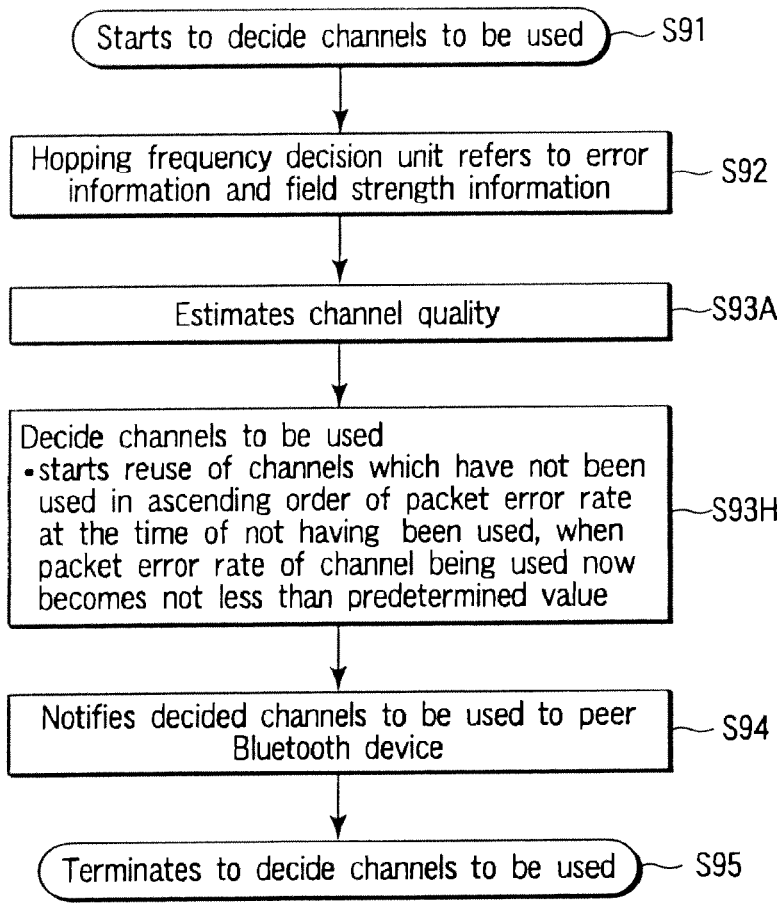
FIG. 18 is a flowchart showing a procedure deciding a channel to be used, executed by the Bluetooth device in a ninth embodiment.

A flowchart in FIG. 18 shows the procedure deciding the channel to be used in the ninth embodiment. The procedure deciding the channel to be used shown in FIG. 18 is different in a point that the one step S93 in the basic operation shown in FIG. 8 is divided into two steps S93A and S93H. Other points are the same as those of the flowchart in FIG. 8. The step S93A estimates the channel quality. In the next step S93H, in the case of decision of a channel to be used in response to the estimated channel qualities, the Bluetooth device starts to use again channels in ascending order of the packet error rates which have not been used due to the previous decision of their deterioration in quality, when the packet error rate of the channel currently used becomes larger than a prescribed value.

According to the ninth embodiment, the Bluetooth device uses the channels in descending order of channels possible to be used in a new radio environment. Thereby, the Bluetooth device can quickly detect the channels usable in the new radio environment.

(Tenth Embodiment)

In the Bluetooth device, it is defined that the Bluetooth device feedbacks the channel quality determination result on other party side to its own side to take the result into account and decides the channel to be used. The reason for the above-described definition is to solve the problem so-called the hidden terminal problem such that the use of the channel causes a communication quality to be deteriorated after all when any radio wave is not reached master side to an extent to affect on communications although radio waves affect on a slave side. However, on the other hand, in a multi-vender environment, it is dangerous to fully depend on a quality determination result brought from the other party side.

In the tenth embodiment, the quality estimation results brought from the other party side are referred to a certain extent and when the channel to be used is decided, the quality estimation results of each channel notified from a peer radio device are reflected to the packet error rates calculated by itself. More specifically, the Bluetooth device subtracts prescribed values from each calculated packet error rate, respectively, if the quality determination results of each channel notified from the peer radio device are excellent. And otherwise, the Bluetooth device adds a prescribed value to each packet error rate. The channel to be used is decided on the basis of the values to which such changes are added.

Figure 19:
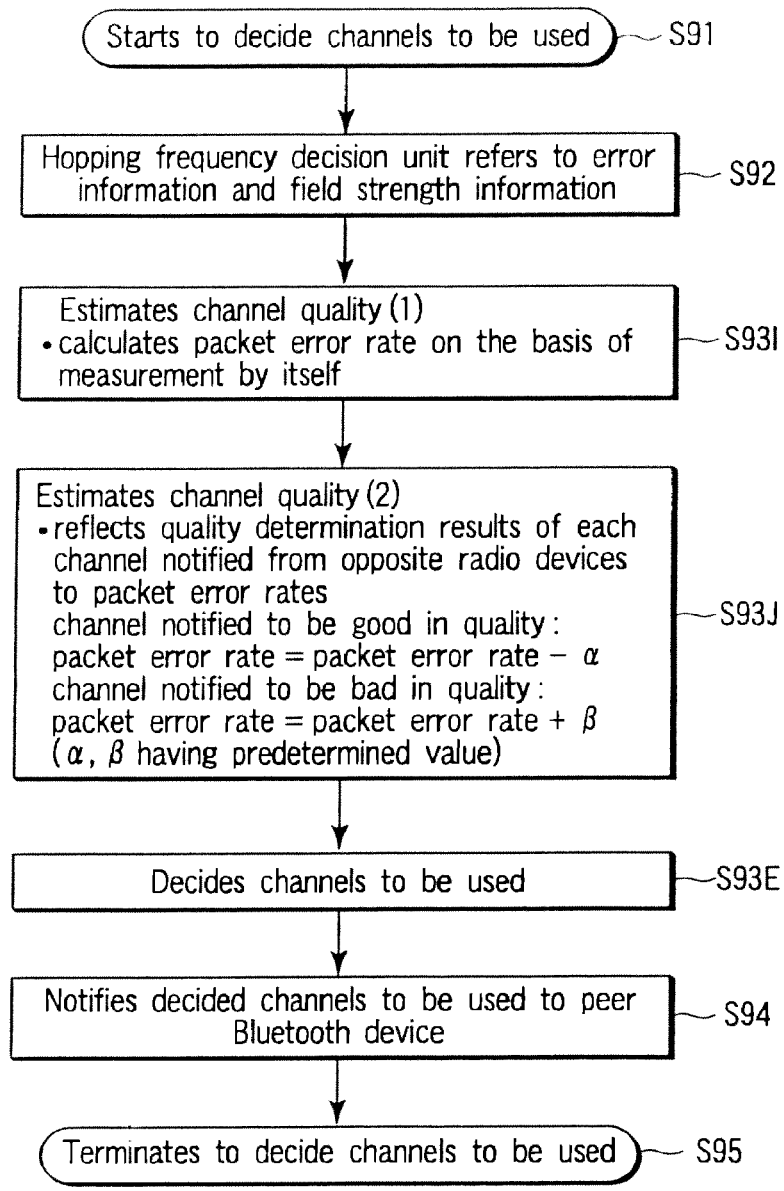
FIG. 19 is a flowchart showing a procedure deciding a channel to be used, executed by the Bluetooth device in a tenth embodiment.

A flowchart in FIG. 19 shows the procedure deciding the channel to be used in the tenth embodiment. The procedure deciding the channel to be used shown in FIG. 19 is different in a point that the one step S93 in the basic operation shown in FIG. 8 is divided into three steps S93I, S93J and S93E. Other points are the same as those of the flowchart in FIG. 8.

In the step S93I, the Bluetooth device calculates the packet error rates on the basis of its own observation result to estimate the channel qualities. In the next step S93J, the quality determination results of each channel notified from the peer radio device are reflected to the packet error rates calculated in the step S93I. That is, the Bluetooth device subtracts a fixed value $\alpha$ from each packet error rate calculated in the step S93I for the channels notified to be excellent in quality and adds a fixed value $\beta$ to each packet error rate calculated in the step S93I for the channels notified to be not excellent in quality. The next step S93E then decides the channel to be used, based on the packet error rates calculated in the step S93J.

According to the tenth embodiment, the Bluetooth device can reflect the channel quality determination result of the peer device to decide the channel to be used. Thereby, the Bluetooth device can suppress deterioration of communication quality caused by the interference source affecting on the peer radio device. Further, since the Bluetooth device reflects the channel quality determination result from the peer radio device to its own measurement result to decide the channel to be used on the basis of the measurement result, the Bluetooth device can minimize the deterioration in communication quality when the peer radio device has sent a channel quality determination result with low reliability.

The band widths of channels used in the wireless LAN are, as described above, wider than the channel width of the Bluetooth. Whereby, supposing that the interference source is the wireless LAN, when the quality of the channel with the Bluetooth present therein becomes lower, the channel of the Bluetooth can be estimated, which is influenced by the channel of the wireless LAN. Therefore, when deciding the channel to be used, the Bluetooth device can assume the channels of the number predetermined, which are adjacent to the channels recognized to be deteriorated in quality are simultaneously deteriorated in quality and can decide that the channels should not be used.

(Eleventh Embodiment)

When the channels to be used in the AFH reduced in number, since power exceeds antenna power per 1 MHz regulated by radio wave laws in some countries to depart form conditions for a device allowed to be used in the ISM band, it is needed to avoid such a situation.

In the eleventh embodiment, the Bluetooth device sends radio waves with the power as maximum as defined in response to the number of channels of which the use are determined when this number of the channels is smaller than a prescribed number.

That is, the Bluetooth device can send a message that is 'link manager protocol (LMP)_incr_power_req protocol data unit (PDU) to other party between terminals now in communications when the radio waves become weak and can request for radio wave transmissions with further strong power. The side which has received this message intends to increase the transmission power in response to this message. At this moment, the Bluetooth device refers to the number of the channels now used in the AFH. If the number of the channels is smaller than the predetermined number, the Bluetooth device increases the transmission power up to the value, for example, the value smaller than the maximum power possible to be transmitted by the wireless LAN module. If the number of the channels exceeds the predetermined number, even when the module has capability to physically sent the transmission power, the Bluetooth device sends a message LMP_max power PDU notifying that it cannot send the radio waves with the power more than the power defined in response to the number of the channels determined to be used and rejects to further increase the transmission power.

On the contrary, if the Bluetooth device sends the radio waves with the power stronger than the antenna power per 1 MHz defined in response to the number of channels determined to be used, the Bluetooth device does not notify the power to a communication partner and decreases the transmission power to the power defined by the number of the corresponding channels.

The procedure deciding transmission power in the transmission unit 41 of the eleventh embodiment is shown in a flowchart in FIG. 20. A flowchart in FIG. 21 shows the procedure deciding the channel to be used in the eleventh embodiment.

At first, the procedure deciding the transmission power will be described by referring to FIG. 20. When receiving the message LMP_incr_power_req PDU, the Bluetooth device starts protocol processing (step S101). Firstly, it is determined whether or not the transmission power has reached the physical maximum power (step S102). If it has reached the maximum power, a process not to change the transmission power is conducted (step S103), then, the message LMP_max_power PDU is sent (step S104) and the protocol processing in the case receiving the message LMP_incr_power_req PDU is completed (step S105).

When the step S102 determines that the transmission power has not reached the maximum power, it is determined whether or not the number of the channels now used in the AFH is smaller than the threshold value of the number of the channels (step S106). If the number is determined not to be smaller than the threshold value, the transmission power is increased (step S107) then the protocol processing in the case of receiving the message LMP_incr_power_req PDU is terminated (step S105). On the contrary, if the number of the channels is determined to be smaller than the threshold value in the step S106, it is determined whether or not the transmission power has already reached the power regulated by radio wave law (step S108). Then if it has reached, the aforementioned step S103 does not change the transmission power, and otherwise, the aforementioned step S107 increases the transmission power.

Figure 21:
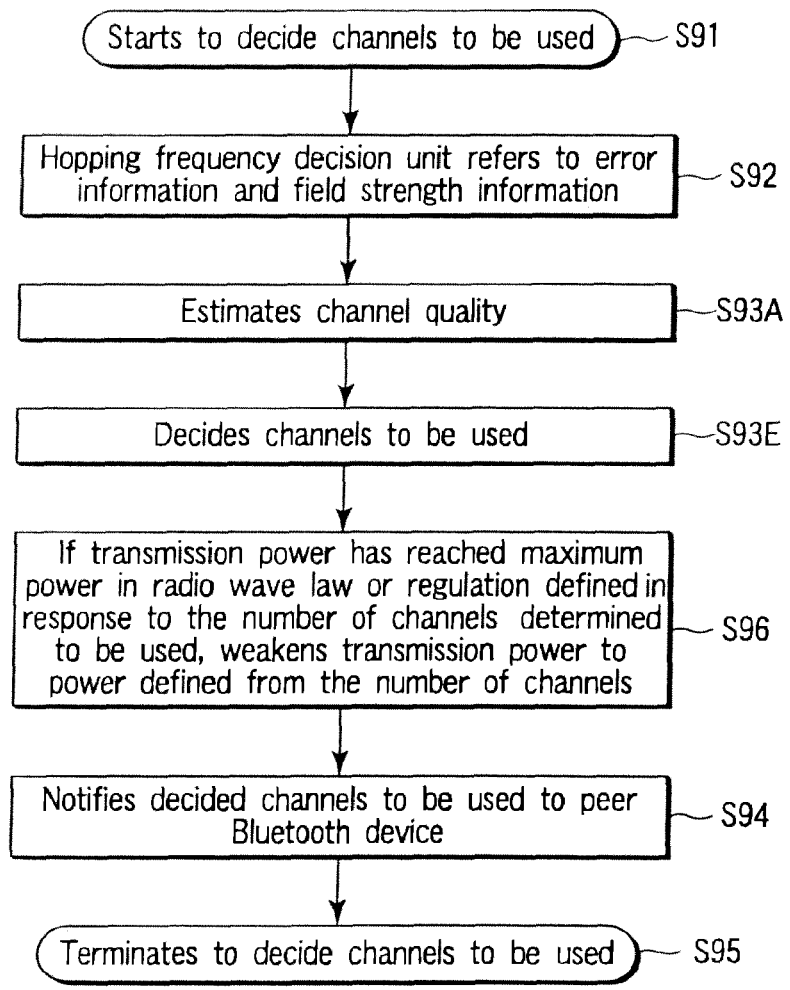
FIG. 21 is a flowchart showing a procedure deciding a channel to be used, executed by the Bluetooth device in the eleventh embodiment.

The step S96 of the flowchart shown in FIG. 21 is equivalent to the procedure to decide the transmission power shown in FIG. 20. The procedure deciding the channel to be used shown in FIG. 21 is different in a point that the one step S93 in the basic operation shown in FIG. 8 is divided into two steps S93A and S93E and in a point that the step S96 equivalent to the procedure deciding the transmission power shown in FIG. 20 is executed after the step S93E. Other points are the same as those of the flowchart in FIG. 8.

That is to say, after estimating the channel qualities and deciding the channel to be used in the steps S93A and S93E, the transmission power is decided.

Operations of the Bluetooth device in the eleventh embodiment will be described in detail as follows. As the result from the estimation of the channel qualities, transmission approved maximum power defined from the number of channels determined to be used is compared with the transmission power from the device at that time. If the radio waves are intended to be transmitted with the transmission power exceeding the transmission approved maximum power, the transmission power is minimized to the transmission approved maximum power. The transmission approved maximum power is given by, for example, A×N when the number of channels determined to be used is set to N and antenna power per 1 MHz to apply to a technical standard is set to A (mW), by taking into account the fact that the band width of the channel of the Bluetooth is 1 MHz.

The Bluetooth can request for the message of LMP_incr_power_req PDU to increase the transmission power to the peer side or for the message of LMP_decr_power_req PDU to decrease the transmission power so as to fit into a range less in error and possible to be demodulated (Golden Range) during communications. In the case of performance of the foregoing processing, when the message LMP_incr_power_req PDU is requested from the peer device, if acceptance of the request causes the transmission power to be exceeded the transmission approved maximum power, the Bluetooth device may notify that it is impossible to further increase the transmission power (LMP_max_power PDU) to the peer side and send the radio waves with the transmission approved maximum power.

In this case, the quality of a communication with the device with the LMP_max_power PDU notified thereto remains in a deteriorated state because the reception power does not fit into the Golden Range of the device. This fact indicates that the Sync Error, Header Error and data section Error are in increased states. Then, in the channel quality estimation systems of the foregoing each embodiment, it occurs to determine a communication quality of a channel is in a deteriorated state. A device with a high output, which is called class 1 among the Bluetooth devices, limits the antenna power so as to make the device match to the technical standard. Therefore, the case of an occurrence of such a state is mainly generated in the case where the distance to the device communicating in the presence of the interference source such as the wireless LAN around the device becomes long gradually. In this case, since a communication distance is long, time variations of effects from the interference source such as the wireless LAN affected on the Bluetooth communication is small and the possibility is low, wherein another channel which has been already determined to be bad in quality has changed into a state good in quality. In this case, it is assumed that operations to find out the channel which has been varied into an excellent state among the channels which have been determined to be in bad qualities causes the communication qualities among devices to be extremely influenced. To prevent this situation, it is preferable to continue the use of channels as much as possible, which were previously determined to be used. To achieve this situation, the Bluetooth device may increase, in advance, the threshold value of the packet error rate, in which the quality of the channel is determined to be bad, by the predetermined value when making communications with the devices of which the transmission power is controlled so as not to exceed the transmission approved maximum power. In this case, the distance from the peer device is shortened again, the message of LMP_decr_power_req PDU is notified from the peer side device and when the peer side requests the transmission with the power less than the transmission approved maximum power, the threshold value of the packet error rates determined to be in bad qualities may be reverted to original values. Or, if the aforementioned situations occur, the channel quality estimation operations may be stopped at the occurrence time. In the case of stopping the channel quality estimation operations, the distance from the peer device is shorten again, and the message of LMP_decr_power_req PDU is notified from the peer side device, and the channel quality estimation operations may be restarted when the transmission in the power less than the transmission approved maximum power is requested from the peer side.

There is the case where the received radio waves from the peer device become weak and the message LMP_max_power PDU retunes as the result of the transmission of the message LMP_incr_power_req PDU to the peer side. At this time, in the case of setting upper limit of the transmission power in response to the number of the selected channels in order to avoid the transmission exceeding the transmission approved maximum power, the meaning of this message LMP_max_power PDU includes the two cases as follows.

(1) The case in which the transmission power has reached the maximum power allowed to be transmitted from the peer device.

(2) The case in which the transmission power has reached the transmission approved maximum power in response to the number of selected channels.

In the Bluetooth, since an absolute value of the transmission power from the peer side device cannot be known, it is not distinguished which case of (1) or (2) is represented thorough the message LMP_max_power PDU. However, the limitation of the transmission power having the transmission approved maximum power as the upper limit occurs only in the class 1 device. In this case, it can be assumed that the communication distances among the devices become long and the variations in time of interference from the interference source become small. Therefore, even when the Bluetooth device sends the message LMP_max_power PDU and received the message LMP_incr_power_req PDU, the Bluetooth device may continuously use the channel which has been used as long as possible by increasing the packet error rate to be determined as a bad quality of a channel by a predetermined value or by stopping the channel quality estimation operations as like the case of the reception of the message LMP_incr_power_req PDU. Even when the packet error rate determined to be in the bad quality is increased or when the channel quality estimation operations are stopped, similarly, when the transmission power becomes the value that the device can transmit the message LMP_decr_power_req PDU, the packet error rate determined to be in the bad quality may be reverted to the original rate or the channel quality estimation may be started again.

According to the eleventh embodiment, even if the channel qualities of most of the channels in the ISM band are lowered and the number of the channels used in the Bluetooth is reduced, the antenna power per 1 MHz can be suppressed not more than a fixed value. Therefore, the Bluetooth device can avoid a situation in which the channel to be used becomes a part of the ISM band to affect adverse effects on other devices.

(Twelfth Embodiment)

When deciding the channel to be used, the Bluetooth device needs to always use at least not smaller than a minimum number of channels to be used, which is defined in advance in accordance with the magnitude of the power to be transmitted so as to prevent transmission power per one channel from exceeding the antenna power per 1 MHz regulated by radio laws in some countries. At this time, The Bluetooth device sequentially selects channels in descending order of channel qualities estimated by predetermined method to make communications by using the selected channel. During the communications, the Bluetooth device measures the channel quality, and when the quality is deteriorated less than the predetermined condition, the Bluetooth device stops the use of the channel to start reuse of other channel.

Here, if the channel quality of other channel which has been started the reuse is poor in quality and if the channel quality has a level to be reused, a situation is assumed, in which the number of usable channels becomes smaller than the minimum number defined in accordance with the magnitude of the power to be transmitted. In the case of occurrence of such a situation, the Bluetooth device restricts the number of channels to be stopped their use and always uses not less than the minimum number of channels defined in accordance with the magnitude of the power to be transmitted. In other words, even when there is a risk of being determined that the channel quality is bad to leave adverse effects on communications, there is a necessity to use channels of the number not exceeding the maximum value of the antenna power per 1 MHz in transmission power in the case of keeping the transmission power.

Figure 22:
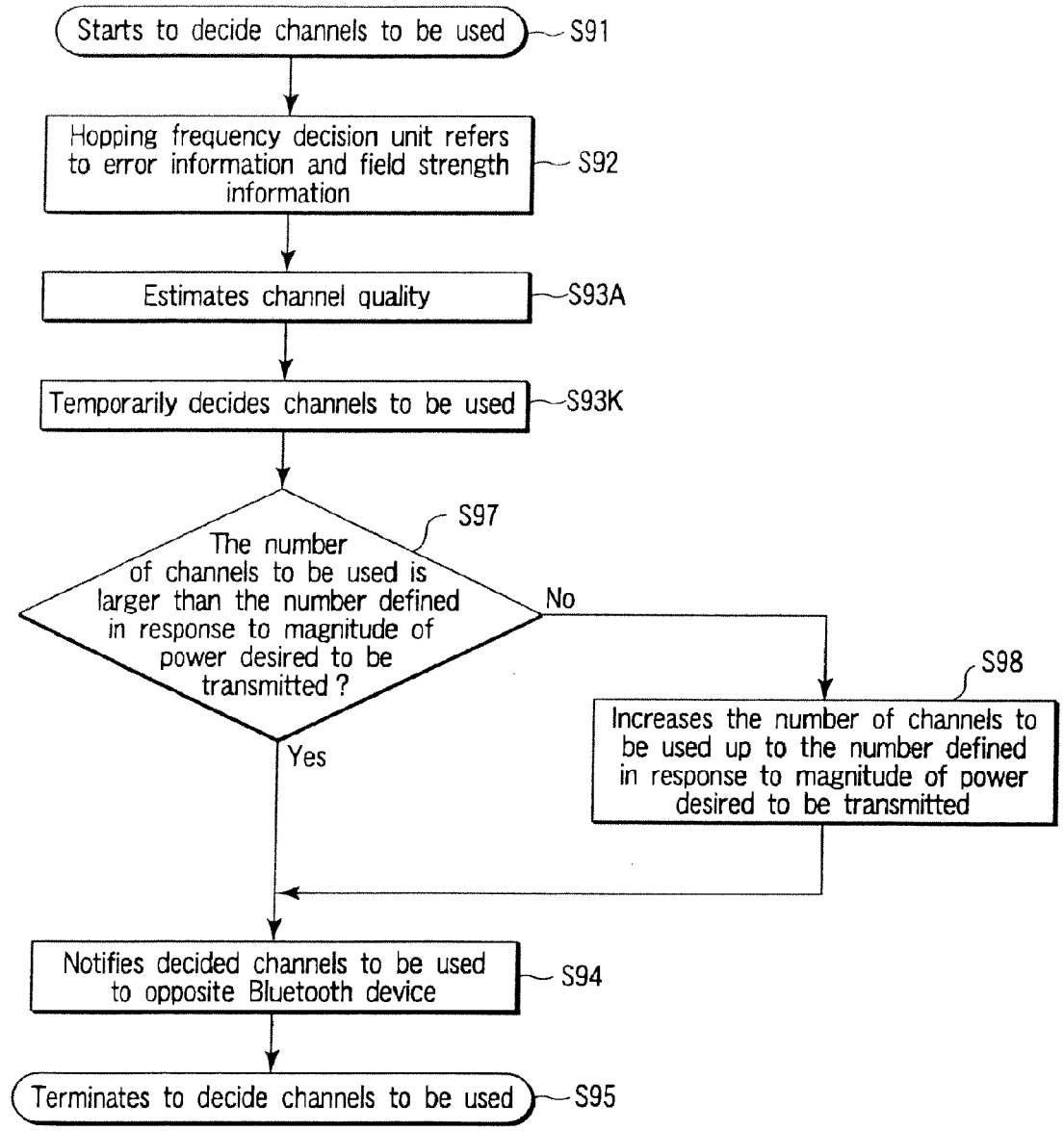
FIG. 22 is a flowchart showing a procedure deciding a channel to be used, executed by the Bluetooth device in a twelfth embodiment.

A flowchart in FIG. 22 shows the procedure deciding the channel to be used in the twelfth embodiment.

The procedure deciding the channel to be used shown in FIG. 22 is different in a point that the one step S93 in the basic operation shown in FIG. 8 is divided into two steps S93A and S93K and in a point that the steps S97 and S98 to decide the transmission power are executed after the step S93K. Other points are the same as those of the flowchart in FIG. 8.

That is to say, after the steps S93A and S93K estimate the channel quality and temporarily decide the channel to be used, the steps S97 and S98 decide the transmission power. At first, it is determined whether or not the number of channels to be used is not smaller than the number predetermined in accordance with the magnitude of the power to be transmitted (step S97). If the number is not smaller than the predetermined number, the Bluetooth device notifies the channel to be used to the Bluetooth device located on the peer side (step S94) to complete its own operations (step S95). Otherwise, the number of the channels to be used is increased until the number reaches the number defined in accordance with the magnitude of the power to be transmitted (step S98) to notify the channel to be used to the Bluetooth device on the peer side (step S94) and the operations are completed (step S95).

According to the twelfth embodiment, even when the channel qualities in most of the ISM band are deteriorated and the number of channels possible to be used by the Bluetooth device is reduced, the antenna power per 1 MHz can be suppressed not more than the fixed value without having to limit the transmission power extremely. Therefore, the Bluetooth device can prevent the situation in which the channels to be used from becoming a part of the ISM band to affect adverse effects on other devices.

The further detailed operations of the Bluetooth device in the twelfth embodiment are described as follows.

According to the result of estimation of channel qualities, the transmission approved maximum power defined from the number of channels determined to be used is compared with the transmission power from the Bluetooth device at this time. If the Bluetooth device intends to transmit the transmission power exceeding the transmission approved maximum power, the Bluetooth device increases the number of the channels to be used so that it can transmit the transmission power within the transmission approved maximum power. The transmission approved maximum power is given by, for example, $A \times N$ when the number of channels determined to be used is set to N and antenna power per 1 MHz to apply to a technical standard is set to A (mW), by taking into account the fact that the band width of the channel of the Bluetooth is 1 MHz. The total number of channels to be newly added becomes $B - A \times N$ when antenna power is set B (mW).

The Bluetooth can request for the message of LMP_incr_power_req PDU to increase the transmission power to the peer side or for the message of LMP_decr_power_req PDU to decrease the transmission power so as to fit into Golden Range during communications. In the case of performance of the foregoing processing, when the message LMP_incr_power_req PDU is requested from the peer device, if acceptance of the request causes the transmission power to be exceeded the transmission approved maximum power, the Bluetooth device continues the use of the channel of which the quality has determined to be bad, in response to the request. This fact indicates that the Sync Error, Header Error and data section Error remain in increased states. In the method for deciding channel to be used adopted to the present invention, the forgoing fact means that it is continuously generated to select a channel to be newly used from among channels of which the qualities are determined to be bad. By the way, a device with a high output, which is called class 1 among the Bluetooth devices, limits the antenna power so as to make the device match to the technical standard. Therefore, the case of an occurrence of such a situation is mainly generated in the case where the distance to the device communicating in the presence of the interference source such as the wireless LAN around the device gradually lengthened. In this case, a communication distance is long. Thus, time variations of effects from the interference source such as the wireless LAN affected on the Bluetooth communication is small and the possibility is low, in which another channel which has been already determined to be band in quality has changed into a state excellent in quality. In this case, it is assumed that operations to find out the channel which has been varied into an excellent state among the channels which have been determined in bad qualities causes the communication qualities among devices to be extremely influenced. To prevent this situation, it is preferable to continue the use of channels as much as possible, which were previously determined to be used. To achieve this situation, the Bluetooth device may increase the threshold value of the packet error rate by the predetermined value, in which the quality of the channel is determined to be bad, by the predetermined value when making communications with the devices of which the number of the channels were increased so as not to exceed the transmission approved maximum power. In this case, the distance from the peer device is shortened again, the message of LMP_decr_power_req PDU is notified from the peer side device, when the transmission approved maximum power can be satisfied even if the channel of which the quality is determined to be very bad is not selected, the Bluetooth device may put back the threshold value of the packet error rate, in which the quality of the channel is determined to be bad.

Alternatively, the estimation of channel quality may be stopped when this takes place. In this case, the distance from the peer device is shortened again. The peer device therefore generates the message, LMP_decr_power_req PDU. The channel quality estimation operations may be restarted when the transmission approved maximum power can be satisfied even if the channel of which the quality is determined to be very bad is not selected.

In the case where the Bluetooth device selects channels including channels which have been bad in quality so as to satisfy the transmission approved maximum power, there is the case where the received radio waves for the message LMP_max_power PDU from the peer device become weak and the fact that the channels which have been determined to be very bad in quality by the Bluetooth device in accordance with the result of the estimation of the channel quality by the peer side device is notified as the result of the transmission of the message LMP_incr_power_req PDU to the peer side. The meaning of this determination of excellent in quality includes the two cases as follows.

(1) The case in which the hidden terminal for the peer side device is present and the peer side device determined the quality is excellent.

(2) The case in which the transmission approved maximum power cannot be satisfied if the Bluetooth device cannot enter a hopping sequence while including the channels which have been determined to be bad in quality.

In the Bluetooth, since an absolute value of the transmission power from the peer side device cannot be known, it is not distinguished which case of (1) or (2) represents the determination that the quality is good by the peer side device different from the determination that the quality is bad by this side device. However, if this side device does not select the channel in accordance with the determination by the peer side device, the peer side device cannot satisfy the transmission approved maximum power.

Each embodiment mentioned above has the following feature in comparison with the invention disclosed by Japan Patent No. 3,443,094.

(1) With respect to the method for estimation channel quality, each of the embodiments can solve a variety of hard problems which occur in calculation of statistic information on the packet error rates.

(2) With respect to the method for selecting channel to be used, each of the embodiments can adopts measures for securing a minimum number of channels so as to reduce possibility of interferences among the Bluetooth devices, measures for corresponding to the case of change in radio wave environment, and the Passive system for compensating the problem that information to estimate qualities of channels not used in the Active system.

(3) With respect to the association between the AFH and the channel selection, each of the embodiments can solve the problem that when the number of channels to be selected becomes small, the antenna power per 1 MHz is increased then it becomes impossible to satisfy the conditions of the device allowed to be used in the ISM band.

The foregoing radio communication terminals in each embodiment and the effects given by the terminals are organized as follows.

(1) The radio communication terminal of the first embodiment receives a packet by sequentially using a plurality of frequency channels in accordance with instructions from the hopping frequency decision unit. When the head of the packet could not be detected in the reception operations, the terminal cannot receive the packet to be originally received because of deterioration in channel quality to consider it as a packet error. When estimating a channel quality of a certain channel, the terminal calculates the packet error rates for each channel on the basis of the number of times the reception operations performed for each channel and the number of times of the packet errors to estimate the channel qualities by using the corresponding packet error rate.

The radio communication terminal having such a configuration provides an effect capable of quickly estimating the channel qualities by the method for estimating channel qualities in the Active system.

(2) The radio communication terminal of the second embodiment receives a packet by sequentially using a plurality of frequency channels in accordance with instructions from the hopping frequency decision unit. The terminal calculates the packet error rates to estimate the channel qualities for the channels which are assumed that of which the qualities are good to be used in the reception operations. And the terminal sequentially measures the field strengths by idle slots to estimate the channel qualities for the channels which are assumed that of which the qualities are bad not to be used in the reception operations.

The radio communication terminal having such a configuration can provides an effect capable of estimating the channel qualities without affecting adverse effects on communications for user data when selecting the channel to be newly used from among the channels which were previously assumed that of which the qualities were bad and which were not used up until now.

(3) The radio communication terminal of the third embodiment receives a packet by sequentially using a plurality of frequency channels in accordance with instructions from the hopping frequency decision unit. The terminal stores the packet error indexes for each channel to update the index as follows when any error was not found in the packets in the reception operations: packet error index=packet error index retroactive by one×[1−(1/B)] (B is a predetermined positive number; 1/B is a value in a range of 0-1). When any error was found in the packets received in the reception operations, the packet error index is updated as follows: packet error index=packet error index retroactive by one× [1−(1/B)]+(1/B). The terminal then estimates the channel qualities by assuming that the updated packet error index is the packet error rate.

The radio communication terminal having such a configuration can calculate the packet error rate approximately, so that the terminal can produce an effect capable of calculating the packet error rate by minimizing a necessary calculation resource.

(4) The radio communication terminal of the fourth embodiment receives a packet by sequentially using a plurality of frequency channels in accordance with instructions from the hopping frequency decision unit. When estimating a channel quality of a certain channel, the terminal starts to estimate the channel quality in accordance with the calculation result of the packet error rate after performing the packet reception operations by the number of predetermined times, and after this, calculates the packet error rates at every packet reception operation to update the estimation of the channel qualities.

The radio communication terminal having such a configuration can estimate the channel qualities by the packet error rates after entering the statistic balance and can produce an effect capable of stably estimate the channel qualities.

(5) The radio communication terminal of the fifth embodiment receives a packet by sequentially using a plurality of frequency channels in accordance with instructions from the hopping frequency decision unit. The terminal individually evaluates quality performance for each channel on the basis of the packet error rates and measured field strengths for each frequency channel selected by the hopping frequency decision unit. And when determining whether or not the corresponding frequency channels are usable on the basis of the estimation result for the frequency channels targeted as the estimation of the channel quality, the terminal selects to use either the channel qualities estimated from the packet error rates or from the measurement results of the field strengths by taking the frequency of the measuring slots in measuring the field strengths into consideration.

The radio communication terminal having such a configuration produces an effect capable of deciding the channel to be used in accordance with the channel quality estimation result which is estimated from communications of user data and is high in reliability even when there are not enough idle slots because of making communications high in load and the reliability of channel quality estimation based on the measurement result of the field strengths is low.

(6) The radio communication terminal of the sixth embodiment receives a packet by sequentially using a plurality of frequency channels in accordance with instructions from the hopping frequency decision unit. The results of sequentially performing the field strength measurement by the idle slots and the packet error rates can be measured as the result of actual communications by using each channel are associated with one another. And when estimating the channel qualities from the measurement results for each selected frequency channels, respectively, the terminal determines that the quality is bad if the observed field strength is higher than the field effect being the predetermined packet error rate, and otherwise the terminal determines that the quality is good.

The radio communication terminal having such a configuration can decide that the quality is assumed to be bad or good on the basis of the result of the field strength measurement by measuring the relationship between the field strength measurement result though the idle slot and the actual packet error rate, so that the terminal can estimate the channel quality with high reliability.

(7) The radio communication terminal of the seventh embodiment receives a packet by sequentially using a plurality of frequency channels in accordance with instructions from the hopping frequency decision unit. When deciding the channel to be used in response to the channel qualities estimated by the predetermined method, the terminal assumes that the channel qualities are the packet error rates to compare the packet rates of each channel with one another and uses the channels of the predetermined number in ascending order of packet error rates, namely in descending order of channel qualities.

The radio communication terminal having such a configuration can produce an effect capable of minimizing the possibility of transmissions with the same frequency when a plurality of the Bluetooth devices performs transmissions.

(8) The radio communication terminal of the eighth embodiment receives a packet by sequentially using a plurality of frequency channels in accordance with instructions from the hopping frequency decision unit. When calculating the packet error rates on the basis of the error detection in the packet reception operations to estimate the channel qualities and deciding the channel to be used in response to the estimated channel quality, if the packet error rate of the channel being used now becomes not less than the predetermined value, the terminal starts reuse of the channel which has not been used due to the determination that the quality was deteriorated previously.

The radio communication terminal having such a configuration assumes that the Bluetooth device or the device being the interference source moves to produce a new radio environment, and produces an effect capable of selecting the channel to newly start the use thereof.

(9) The radio communication terminal of the ninth embodiment receives a packet by sequentially using a plurality of frequency channels in accordance with instructions from the hopping frequency decision unit. When calculating the packet error rates on the basis of the error detection in the packet reception operations to estimate the channel qualities and deciding the channel to be used in response to the estimated channel quality, if the packet error rate of the channel being used now becomes not less than the predetermined value, the terminal starts reuse of the channel which has not been used due to the determination that the quality was deteriorated previously. At this time, the channels started the use thereof are uses in ascending order of packet error rates at the time when the channels were brought into no use.

The radio communication terminal having such a configuration uses the channels in descending order of high possibilities capable of using in new radio environment then can quickly detect the channels usable in the new radio environment.

(10) The radio communication terminal of the tenth embodiment receives a packet by sequentially using a plurality of frequency channels in accordance with instructions from the hopping frequency decision unit. When calculating the packet error rates on the basis of the error detection in the packet reception operations to estimate the channel qualities and deciding whether or not the corresponding frequency channel is usable on the basis of the estimation result of the frequency channel targeted as the estimation object, if the results of quality estimation of each channel notified from the peer radio device are good, the terminal subtracts the predetermined first values from each packet error rate, respectively. And otherwise, the terminal adds the predetermined second values to each packet rate, respectively, and decides the channel to be used by using the results.

The radio communication terminal having such a configuration can suppress deterioration in communication quality caused by the interference source which does not affect on the terminal itself but affects on the peer radio device. The terminal can minimize the deterioration in the communication quality when the peer radio device has sent a channel quality estimation result with low reliability.

(11) The radio communication terminal of the eleventh embodiment receives a packet by sequentially using a plurality of frequency channels in accordance with instructions from the hopping frequency decision unit. As the result of deciding the channel to be used, if the number of channels determined to be used is smaller than the predetermined number, the terminal transmits radio waves through the power defined in response to the number of channels determined to be used as the maximum value.

The radio communication terminal having such a configuration can avoid the situation where the channels to be used become a part of the ISM band to affect adverse effects on other devices.

(12) The radio communication terminal of the twelfth embodiment receives a packet by sequentially using a plurality of frequency channels in accordance with instructions from the hopping frequency decision unit. As the result of deciding the channel to be used, even if the number of channels determined to be used is smaller than the number defined by the transmission power at this time, the terminal uses the channels of the number defined by the transmission power.

The radio communication terminal having such a configuration can avoid the situation where the channels to be used become a part of the ISM band to affect adverse effects on other devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device comprising a first controller, wherein the first controller includes:
a first circuitry configured to select one frequency channel from a plurality of frequency channels,
a reception circuitry configured to receive packet data via the selected frequency channel, and count the number of operations to receive the packet data via the selected frequency channel;
an error detection circuitry configured to detect a packet synchronization error and a synchronization detection error at the selected frequency channel, and to sum up the number of packet synchronization errors and the number of synchronization detection errors,
a second controller configured to calculate a packet error rate for the selected frequency channels based on the number obtained by summing the number of packet synchronization errors and the number of synchronization detection errors, and the number of operations; and
a transmission circuitry configured to transmit packet data by using the selected frequency channel.

2. The device according to claim 1,
wherein the second controller is configured to control selection operation of the first circuitry based on the packet error rate.

3. The device according to claim 2,
wherein the second controller is configured to
determine whether a frequency channel is usable or not based on the result of evaluation of the packet error rate, and
control selection operation of the first circuitry to avoid a frequency channel which is determined as unusable.

4. The device according to claim 2,
wherein after the second controller has calculated the packet error rate, the error detection circuitry is configured to reset the number of operations to receive the packet data and the synchronization detection errors.

5. The device according to claim 2,
wherein if the number of operations is lower than a predetermined number, the second controller is configured to not calculate the packet error rate, and the error detection circuitry is configured to not reset the number of operations to receive the packet data and the synchronization detection errors.

6. The device according to claim 2,
wherein the synchronization detection error indicates that a Sync Word of a preset pattern be not able to detect within a predetermined time period.

7. The device according to claim 6,
wherein the packet synchronization error is a header error or a data section error.

8. The device according to claim 7,
wherein the header error indicates that an error is detected in header error inspection, and the detected error exceeds ability of an error correction code, and
the data section error indicates that an error is detected in data section error inspection, and the detected error exceeds the ability of the error correction code.

9. A semiconductor device comprising a controller,
wherein the controller is configured to
select one frequency channel from a plurality of frequency channels,
receive packet data via the selected frequency channel,
count the number of operations to receive the packet data via the selected frequency channel,
detect a packet synchronization error and a synchronization detection error at the selected frequency channel,
sum up the number of packet synchronization errors and the number of synchronization detection errors,
calculate a packet error rate for the selected frequency channels based on the number obtained by summing the number of packet synchronization errors and the number of synchronization detection errors, and the number of operations, and transmit packet data by using the selected frequency channel.

10. The device according to claim 9, wherein the controller is configured to determine whether each frequency channel is usable or not based on the packet error rate, and select one frequency channel to avoid frequency channels which are determined as unusable.

11. The device according to claim 10, wherein after the selection of the frequency channel, the controller is configured to reset the number of operations to receive the packet data and the synchronization detection errors.

12. The device according to claim 11, wherein if the number of operations is lower than a predetermined number, the controller is configured to not calculate the packet error rate, and to not reset the number of operations to receive the packet data and the synchronization detection errors.

13. The device according to claim 9, wherein the synchronization detection error indicates that a Sync Word of a preset pattern be not able to detect within a predetermined time period.

14. The device according to claim 13, wherein the packet synchronization error is a header error or a data section error.

15. The device according to claim 14, wherein the header error indicates that an error is detected in header error inspection, and the detected error exceeds ability of an error correction code, and the data section error indicates that an error is detected in data section error inspection, and the detected error exceeds the ability of the error correction code.

* * * * *